US012566957B1

(12) United States Patent
Menon et al.

(10) Patent No.: US 12,566,957 B1
(45) Date of Patent: Mar. 3, 2026

(54) SYSTEM AND METHOD FOR AUTOMATIC EVALUATION OF ARTIFICIAL INTELLIGENCE MODELS

(71) Applicant: Genpact USA, Inc., New York, NY (US)

(72) Inventors: Sreekanth Menon, Bangalore (IN); Megha Sinha, Gurgaon (IN); Ram Sagar, Bangalore (IN); Vernika Samadhiya, Delhi (IN)

(73) Assignee: Genpact USA, Inc., New York, NY (US)

( * ) Notice: Subject to any disclaimer, the term of this patent is extended or adjusted under 35 U.S.C. 154(b) by 0 days.

(21) Appl. No.: 19/172,987

(22) Filed: Apr. 8, 2025

(51) Int. Cl.
G06N 3/08 (2023.01)

(52) U.S. Cl.
CPC ..................................... G06N 3/08 (2013.01)

(58) Field of Classification Search
CPC ....................................................... G06N 3/08
See application file for complete search history.

(56) References Cited

U.S. PATENT DOCUMENTS

| | | | |
|---|---|---|---|
| 10,769,570 B2 | 9/2020 | Lu | |
| 11,399,060 B2 | 7/2022 | Morin | |
| 11,915,179 B2 | 2/2024 | Lee et al. | |
| 11,954,112 B2 | 4/2024 | Siebel et al. | |
| 2017/0270408 A1* | 9/2017 | Shi | G06N 3/08 |
| 2022/0300822 A1* | 9/2022 | Shmelkin | G06N 3/088 |

| | | | |
|---|---|---|---|
| 2023/0368868 A1* | 11/2023 | Griffin | G06N 20/00 |
| 2024/0202351 A1* | 6/2024 | Mohammed | G06F 21/6218 |
| 2024/0202751 A1* | 6/2024 | Coleman | G06N 20/00 |

(Continued)

OTHER PUBLICATIONS

* Kereopa-Yorke et al. ("Quantifying AI Vulnerabilities: A Synthesis of Complexity, Dynamical Systems, and Game Theory", NPL, arXiv:2404.10782, 2024) (Year: 2024).*

*Primary Examiner* — Imad Kassim
(74) *Attorney, Agent, or Firm* — Goodwin Procter LLP

(57) ABSTRACT

A method for automatic evaluation of an artificial intelligence (AI) model is presented. The method can include receiving, at a computer system comprising a processor and a memory storing instructions executable by the processor, a pretrained AI model, an input dataset, and an expected predictions dataset, wherein the expected predictions dataset comprises expected results of the pretrained AI model based on the input dataset. The method can include generating an actual predictions dataset using the pretrained AI model by providing, by the processor, the input dataset as input to the pretrained AI model and receiving, at the computer system, as output from the pretrained AI model a plurality of predictions based on the input dataset. The method can include calculating, by the processor, a plurality of algorithmic metrics based on the expected predictions dataset and the actual predictions dataset. The method can include determining, by the processor, a responsible AI (RAI) score based on the plurality of algorithmic metrics. The method can include calculating, by the processor, a RAI health score based on the RAI score and a safety fraction. The method can include comparing, by the processor, the RAI health score to a RAI health metric. The method can include determining, by the processor, an overall RAI health of the pretrained AI model based on the comparison.

21 Claims, 17 Drawing Sheets

(56) References Cited

U.S. PATENT DOCUMENTS

| | | | |
|---|---|---|---|
| 2024/0256964 A1* | 8/2024 | Tay ........................ | G06N 3/045 |
| 2025/0068982 A1* | 2/2025 | Huang ................... | G06N 20/20 |
| 2025/0078091 A1* | 3/2025 | Munguia Tapia ..... | G06N 20/00 |

* cited by examiner

162

$$\text{Risk Fraction} = \left[\left(\sum_c \left(\sum_{j \in Q} q_j\right) \times W_c\right) + P_f\right] / \left(\sum_{max} \left(\sum_{j \in Q} q_j\right) \times W_c\right)\right] * 100$$

132 — Safety Fraction ($S_z$) =

$$100 * \left[1 - \left[\left(\sum_c \left(\sum_{j \in Q} q_j\right) \times W_c\right) + P_f / \left(\sum_{max} \left(\sum_{j \in Q} q_j\right) \times W_c\right)\right]\right]$$

$$S_L = \left[1 - \left[\frac{\left(\sum_c \left(\sum_{j \in Q} q_j\right) \times W_c\right) + P_f}{\left[\sum_{max}\left(\sum_{j \in Q} q_j\right) \times W_c\right]}\right]\right]$$

| Penalty coefficient ($\beta$) Value | Percentage of unanswered uncritical questions ($k_{fail}/k_0$) × |
|---|---|
| | 100 |
| 1 | <20 |
| 2 | (20,49) |
| 3 | >50 |

$P_f = \beta \cdot (k_{fail}/k_0)$ $\sum_{max}\left(\sum_{j \in Q} q_j\right) \times W_c = 9$; is the maximum possible Risk Level Value.

Figure 2:
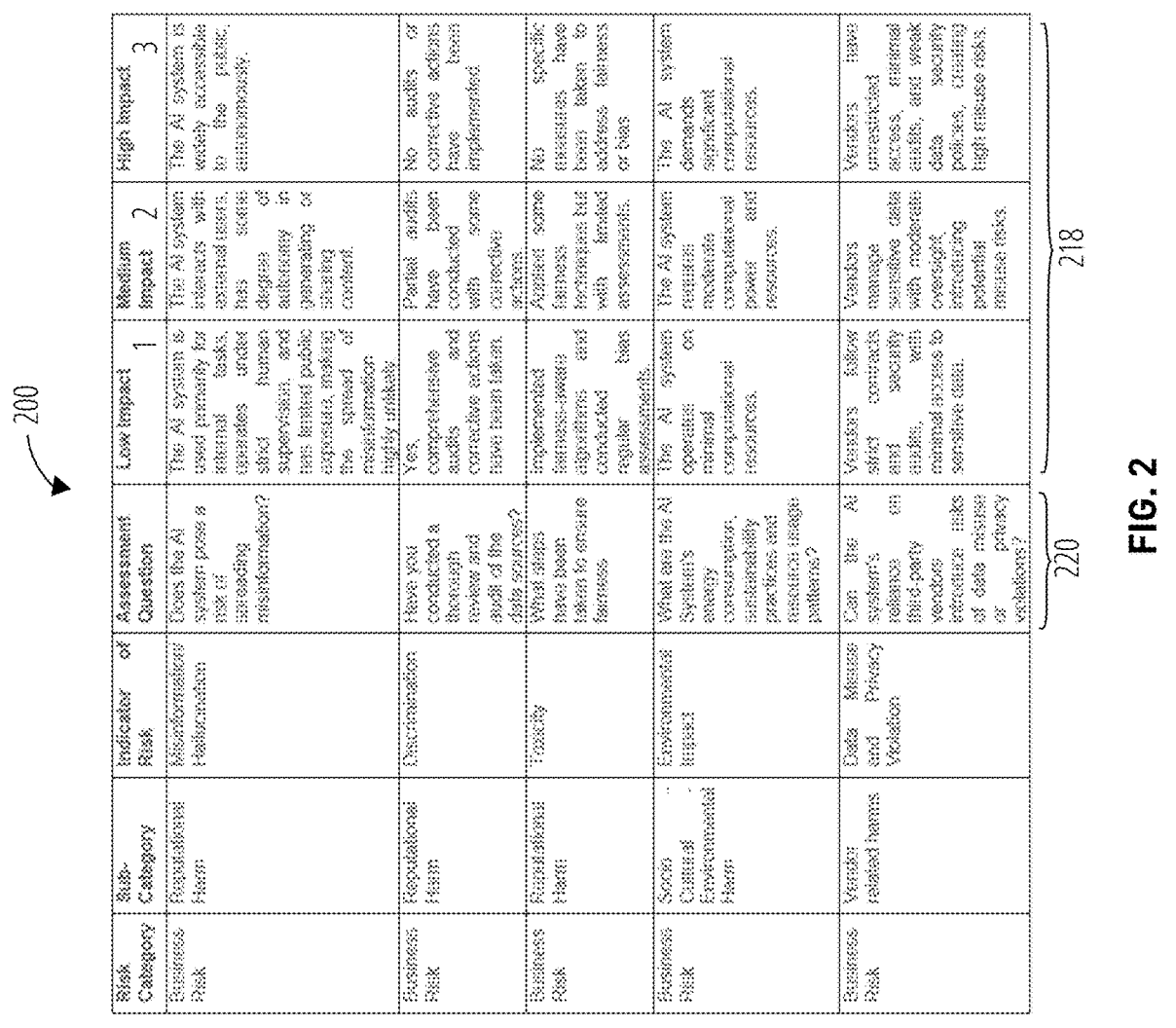

| Risk Category | Sub-Category | Indicator of Risk | Assessment Question | Low Impact 1 | Medium Impact 2 | High Impact 3 |
|---|---|---|---|---|---|---|
| Business Risk | Reputational Harm | Misinformation/Disinformation | Does the AI system pose a risk of spreading misinformation? | The AI system is used primarily for internal tasks, generates under little human supervision, and not limited public exposure, making the speed of misinformation highly unlikely. | The AI system interacts with external users, has some degree of autonomy providing sharing content | The AI system is widely accessible to the public, autonomously. |
| Business Risk | Reputational Harm | Discrimination | Have you conducted a thorough review and audit of the data sources? What steps have been taken to address bias factors? | Yes, comprehensive audits and corrective actions have been taken, regular | Partial audits have been conducted with some corrective actions | No audits or corrective actions have been implemented |
| Business Risk | Financial Harm | Toxicity | | employee-related business-related litigations and conducted on regular basis | Appears some fairness but limited with assessments | No specific measures have been taken to address fairness or bias |
| Business Risk | Socio Cultural Environmental Harm | Environmental impact | What are the AI System's safety, sustainability practices and emissions usage patterns? | The AI system operating minimal computational resources. | The AI system creates moderate computational power and resources | The AI system demands significant computational resources. |
| Business Risk | Vendor related harms | Data Misuse and Privacy Violation | Can the AI system's reliance on third-party vendors introduce make misuse of data privacy violations? | Vendors strict contracts and security with audits, minimal access to sensitive data. | Vendors manage sensitive data with moderate oversight, introducing potential misuse risks | Vendors have unrestricted access, minimal data security policies, creating high misuse risks. |

Responsible AI Principles

300

| DOMAIN SPECIFIC BUSINESS METRICS EVALUATION 302 | AUTONOMY AND ACCOUNTABILITY 310 |
| DATA DRIFT MITIGATION 304 | FAIRNESS 312 |
| RELIABILITY AND SAFETY 306 | INTERPRETABILITY AND EXPLAINABILITY 314 |
| PRIVACY AND SECURITY 308 | TRACEABILITY 316 |

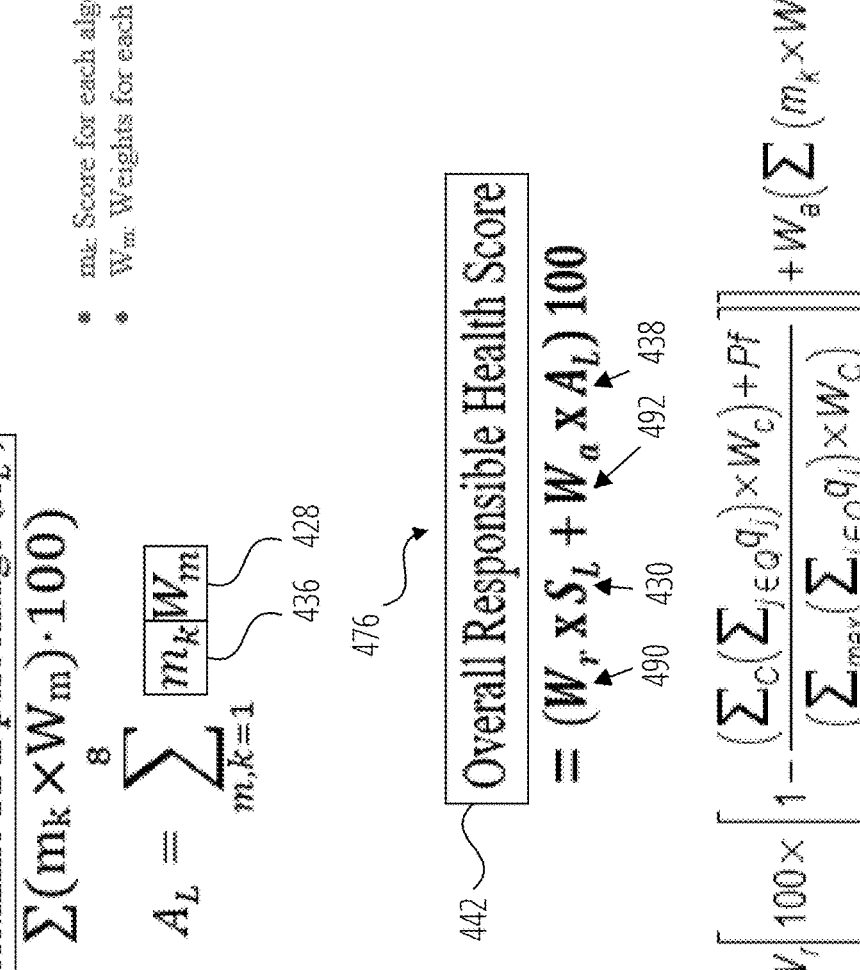

- $m_k$: Score for each algorithmic metric
- $W_m$: Weights for each algorithmic metric Algorithmic RAI percentage $(A_L) = \sum (m_k \times W_m) \cdot 100)$ $$A_L = \sum_{m,k=1}^{8} \boxed{m_k \, | \, W_m}$$

Overall Responsible Health Score $$= (W_r \times S_L + W_a \times A_L) \, 100$$

$$R = W_f \left[ 100 \times \left[ 1 - \left[ \frac{\left(\sum_c \left(\sum_{j \in Q} q_j\right) \times W_c\right) + Pf}{\left(\sum_{max} \left(\sum_{j \in Q} q_j\right) \times W_c\right)} \right] \right] + W_a \left(\sum \left(m_k \times W_m\right) \times 100\right) \right]$$

Figure 4D:
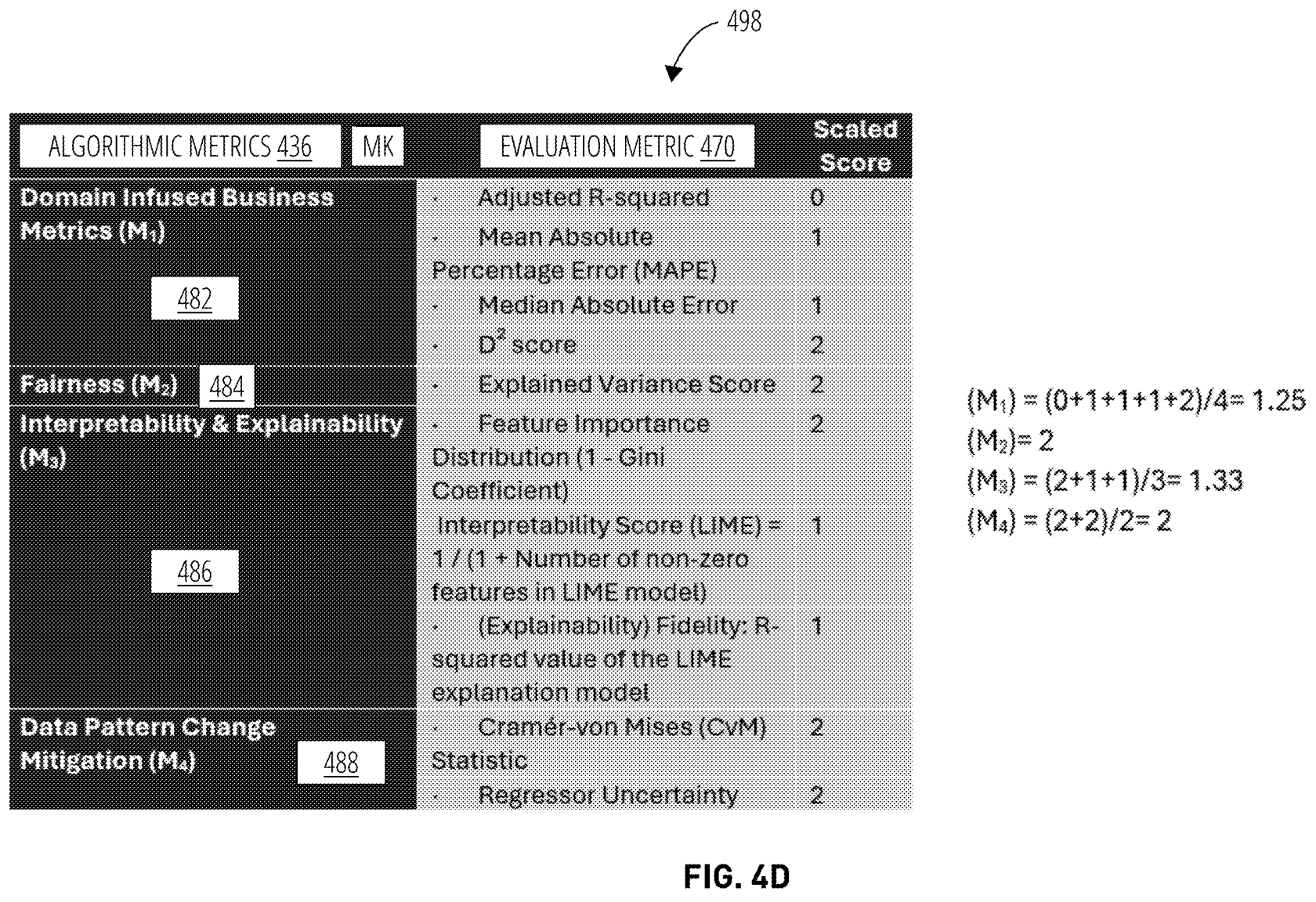

| ALGORITHMIC METRICS 436 | MK | EVALUATION METRIC 470 | Scaled Score |
|---|---|---|---|
| Domain Infused Business Metrics (M₁) 482 | | Adjusted R-squared | 0 |
| | | Mean Absolute Percentage Error (MAPE) | 1 |
| | | Median Absolute Error | 1 |
| | | D² score | 2 |
| Fairness (M₂) 484 | | Explained Variance Score | 2 |
| Interpretability & Explainability (M₃) 486 | | Feature Importance Distribution (1 - Gini Coefficient) | 2 |
| | | Interpretability Score (LIME) = 1 / (1 + Number of non-zero features in LIME model) | 1 |
| | | (Explainability) Fidelity R-squared value of the LIME explanation model | 1 |
| Data Pattern Change Mitigation (M₄) 488 | | Cramér-von Mises (CvM) Statistic | 2 |
| | | Regressor Uncertainty | 2 |

Figure 5A:
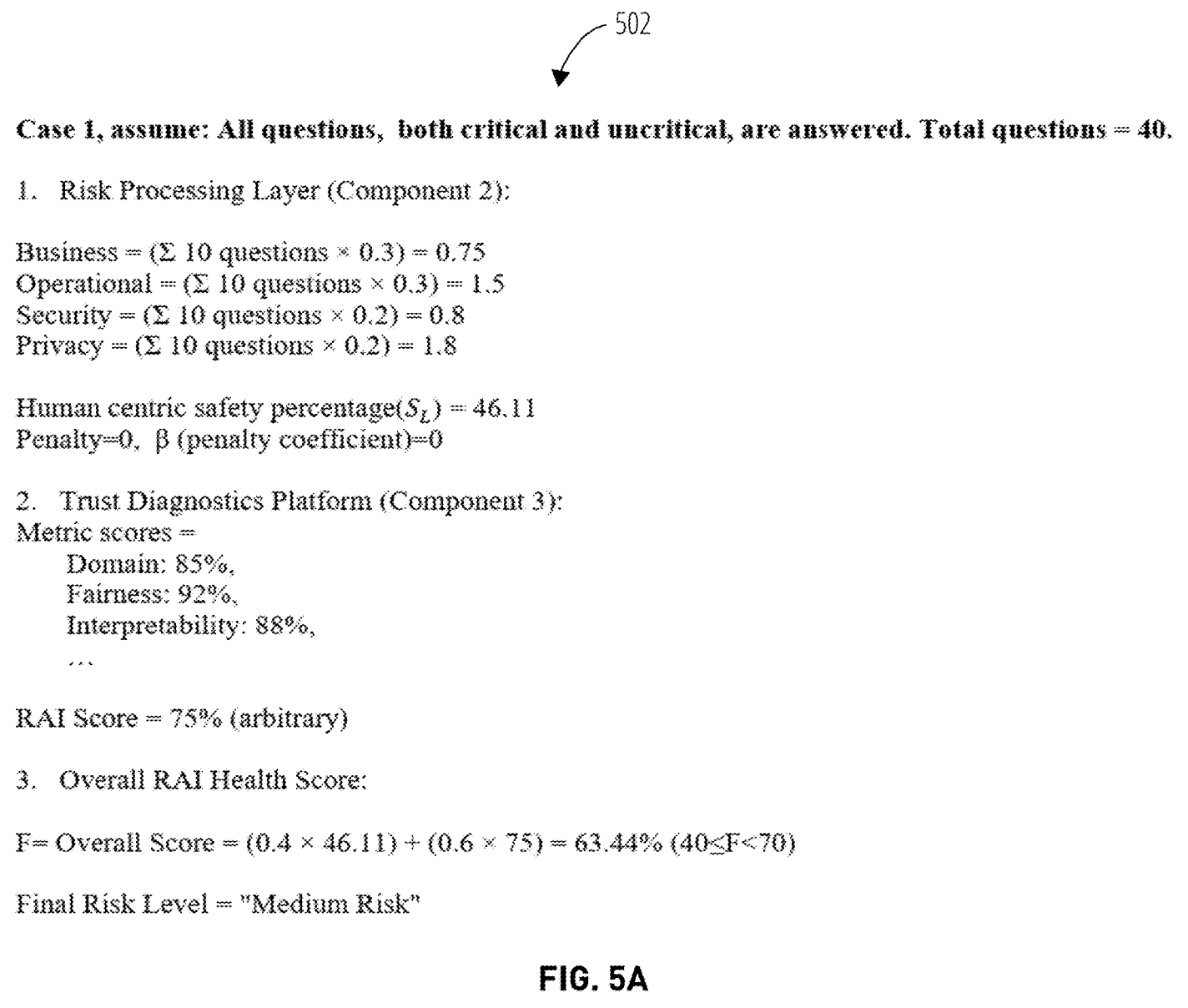

Case 1, assume: All questions, both critical and uncritical, are answered. Total questions = 40.

1. Risk Processing Layer (Component 2):

Business = ($\Sigma$ 10 questions $\times$ 0.3) = 0.75
Operational = ($\Sigma$ 10 questions $\times$ 0.3) = 1.5
Security = ($\Sigma$ 10 questions $\times$ 0.2) = 0.8
Privacy = ($\Sigma$ 10 questions $\times$ 0.2) = 1.8

Human centric safety percentage($S_Z$) = 46.11
Penalty=0,  $\beta$ (penalty coefficient)=0

2. Trust Diagnostics Platform (Component 3):
Metric scores =
    Domain: 85%,
    Fairness: 92%,
    Interpretability: 88%,
    ...

RAI Score = 75% (arbitrary)

3. Overall RAI Health Score:

F= Overall Score = (0.4 $\times$ 46.11) + (0.6 $\times$ 75) = 63.44% (40$\leq$F<70)

Final Risk Level = "Medium Risk"

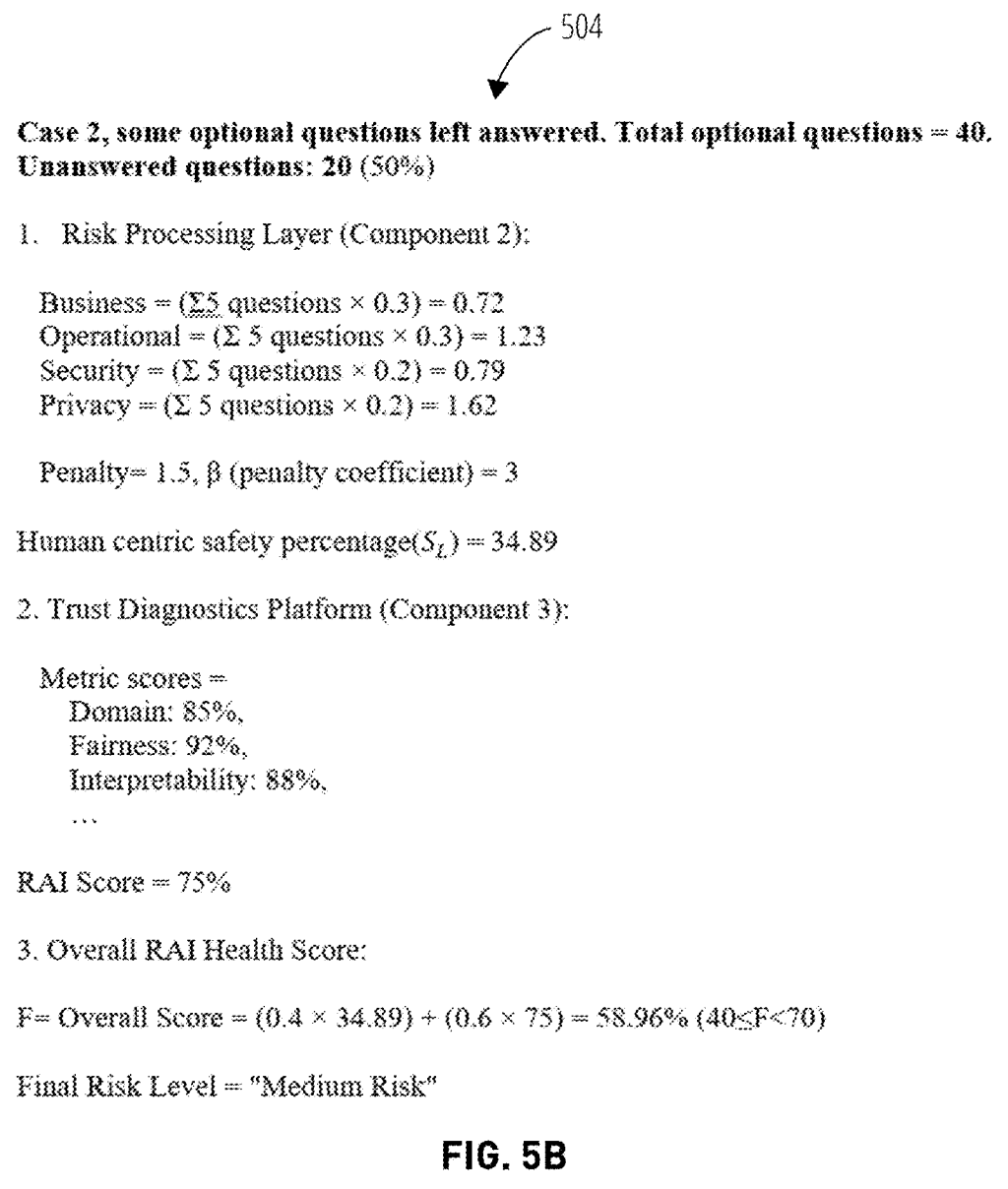

Case 2, some optional questions left answered. Total optional questions = 40. Unanswered questions: 20 (50%)

1. Risk Processing Layer (Component 2):

Business = ($\Sigma$5 questions × 0.3) = 0.72
Operational = ($\Sigma$ 5 questions × 0.3) = 1.23
Security = ($\Sigma$ 5 questions × 0.2) = 0.79
Privacy = ($\Sigma$ 5 questions × 0.2) = 1.62

Penalty= 1.5, $\beta$ (penalty coefficient) = 3

Human centric safety percentage($S_L$) = 34.89

2. Trust Diagnostics Platform (Component 3):

Metric scores =
    Domain: 85%,
    Fairness: 92%,
    Interpretability: 88%,
    ...

RAI Score = 75%

3. Overall RAI Health Score:

F= Overall Score = (0.4 × 34.89) + (0.6 × 75) = 58.96% (40≤F<70)

Final Risk Level = "Medium Risk"

FIG. 5B

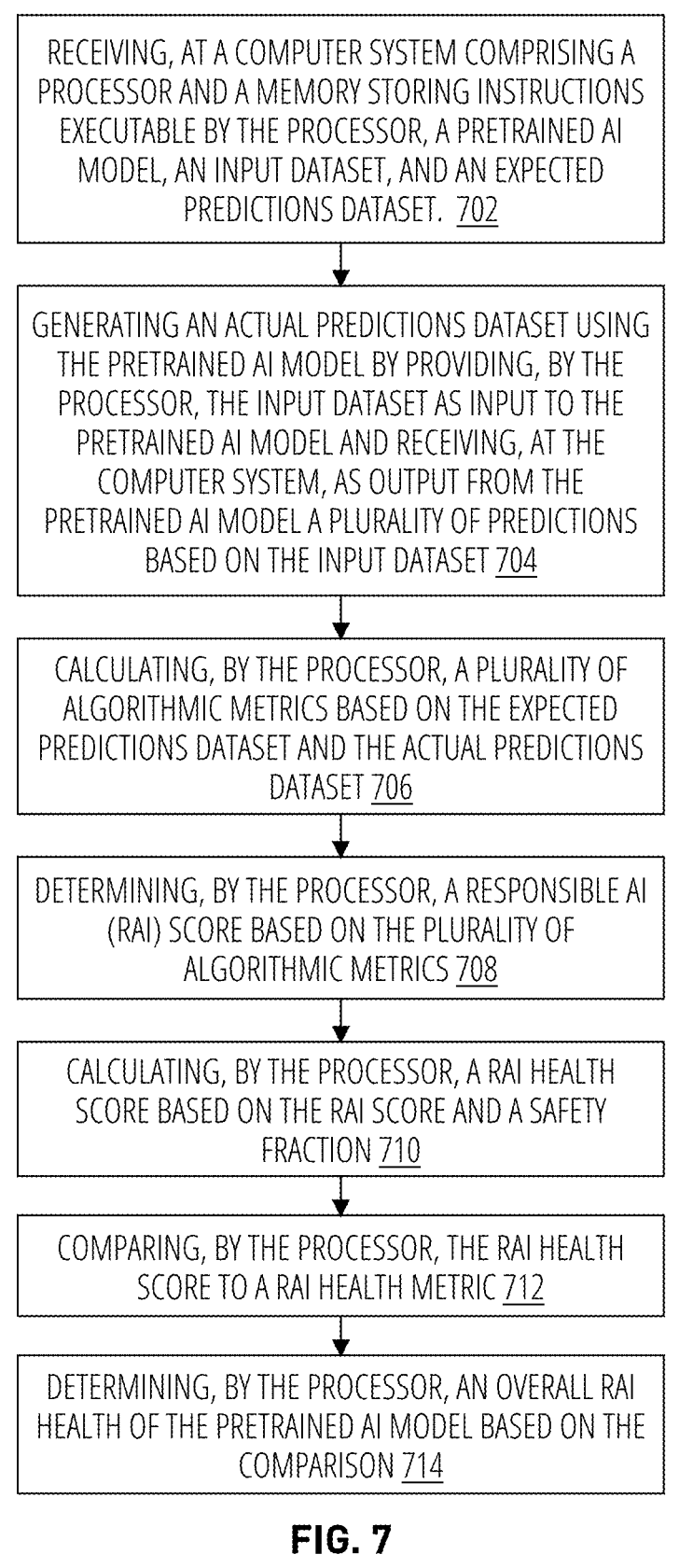

RECEIVING, AT A COMPUTER SYSTEM COMPRISING A PROCESSOR AND A MEMORY STORING INSTRUCTIONS EXECUTABLE BY THE PROCESSOR, A PRETRAINED AI MODEL, AN INPUT DATASET, AND AN EXPECTED PREDICTIONS DATASET. 702

↓

GENERATING AN ACTUAL PREDICTIONS DATASET USING THE PRETRAINED AI MODEL BY PROVIDING, BY THE PROCESSOR, THE INPUT DATASET AS INPUT TO THE PRETRAINED AI MODEL AND RECEIVING, AT THE COMPUTER SYSTEM, AS OUTPUT FROM THE PRETRAINED AI MODEL A PLURALITY OF PREDICTIONS BASED ON THE INPUT DATASET 704

↓

CALCULATING, BY THE PROCESSOR, A PLURALITY OF ALGORITHMIC METRICS BASED ON THE EXPECTED PREDICTIONS DATASET AND THE ACTUAL PREDICTIONS DATASET 706

↓

DETERMINING, BY THE PROCESSOR, A RESPONSIBLE AI (RAI) SCORE BASED ON THE PLURALITY OF ALGORITHMIC METRICS 708

↓

CALCULATING, BY THE PROCESSOR, A RAI HEALTH SCORE BASED ON THE RAI SCORE AND A SAFETY FRACTION 710

↓

COMPARING, BY THE PROCESSOR, THE RAI HEALTH SCORE TO A RAI HEALTH METRIC 712

↓

DETERMINING, BY THE PROCESSOR, AN OVERALL RAI HEALTH OF THE PRETRAINED AI MODEL BASED ON THE COMPARISON 714

FIG. 7

SYSTEM AND METHOD FOR AUTOMATIC EVALUATION OF ARTIFICIAL INTELLIGENCE MODELS

TECHNICAL FIELD

The present disclosure generally relates to systems and methods for automatically evaluating artificial intelligence (AI) models, and more specifically, systems and methods for automatically determining the behavior and performance of AI models based on defined metrics.

BACKGROUND

Conventional AI systems make use of AI models to make predictions based on some provided parameter or data. The integrity of the predictions are expected to be reliable, but the actual results provided by the AI models can vary. For example, generative AI models may provide hallucinatory responses that may look correct, but are actually are incorrect or the results may be misleading. Conventional AI systems rely on manual user intervention and assessment of the AI models to determine whether the AI model provides safe, trustworthy, and truthful output. Furthermore, the manual nature of assessing the behavior of AI models is time consuming and can be prone to errors.

The foregoing discussion, including the description of motivations for some embodiments of the invention, is intended to assist the reader in understanding the present disclosure, is not admitted to be prior art, and does not in any way limit the scope of any of the claims.

SUMMARY

Systems and methods for characterizing an artificial intelligence (AI) model are presented. The method can include receiving, at a computer system including a processor and a memory storing instructions executable by the processor, a pretrained AI model, an input dataset, and an expected predictions dataset, wherein the expected predictions dataset includes expected results of the pretrained AI model based on the input dataset. The method can include generating an actual predictions dataset using the pretrained AI model by providing, by the processor, the input dataset as input to the pretrained AI model and receiving, at the computer system, as output from the pretrained AI model a plurality of predictions based on the input dataset. The method can include calculating, by the processor, a plurality of algorithmic metrics based on the expected predictions dataset and the actual predictions dataset. The method can include determining, by the processor, a responsible AI (RAI) score based on the plurality of algorithmic metrics. The method can include calculating, by the processor, a RAI health score based on the RAI score and a safety fraction. The method can include comparing, by the processor, the RAI health score to a RAI health metric. The method can include determining, by the processor, an overall RAI health of the pretrained AI model based on the comparison. The method can further include, based on the RAI health score, disabling the AI model deployed on an enterprise network.

In some embodiments, the pretrained AI models can include at least one of predictive AI models or generative AI models. In some examples, the input dataset includes a training dataset. The expected predictions dataset can include output data generated from a training AI model. Receiving the pretrained AI model can include receiving a regression-based AI model. Provided a regression-based AI model, the plurality of algorithmic metrics can include at least one of an adjusted R-squared score, a mean absolute percentage error (MAPE), a median absolute error (MAE), a D-squared score, an explained variance score, a feature importance distribution, an interpretability score, a local interpretable model-agnostic explanations (LIME) score, a Cramér-von Mises (CvM) statistic, or a Regressor Uncertainty score. Calculating the plurality of algorithmic metrics includes calculating at least one corresponding evaluation metric for each one of the plurality of algorithmic metrics. Calculating the plurality of algorithmic metrics includes calculating an average metric from the plurality of algorithmic metrics.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 1C illustrates equations used to calculate a safety fraction, according to some embodiments.

FIG. 2 illustrates exemplary assessment questions used to categorize an AI model, according to some embodiments.

FIG. 4B illustrates equations used to calculate a RAI score and RAI health score, according to some embodiments.

FIG. 4D illustrates the table of algorithmic metrics from FIG. 4C including exemplary calculated metric scores, according to some embodiments.

FIG. 5A illustrates an example first case for characterizing an AI model, according to some embodiments.

FIG. 5B illustrates an example second case for characterizing an AI model, according to some embodiments.

FIG. 7 illustrates a flowchart for a method for characterizing an AI model, according to some embodiments.

Figure 1A:
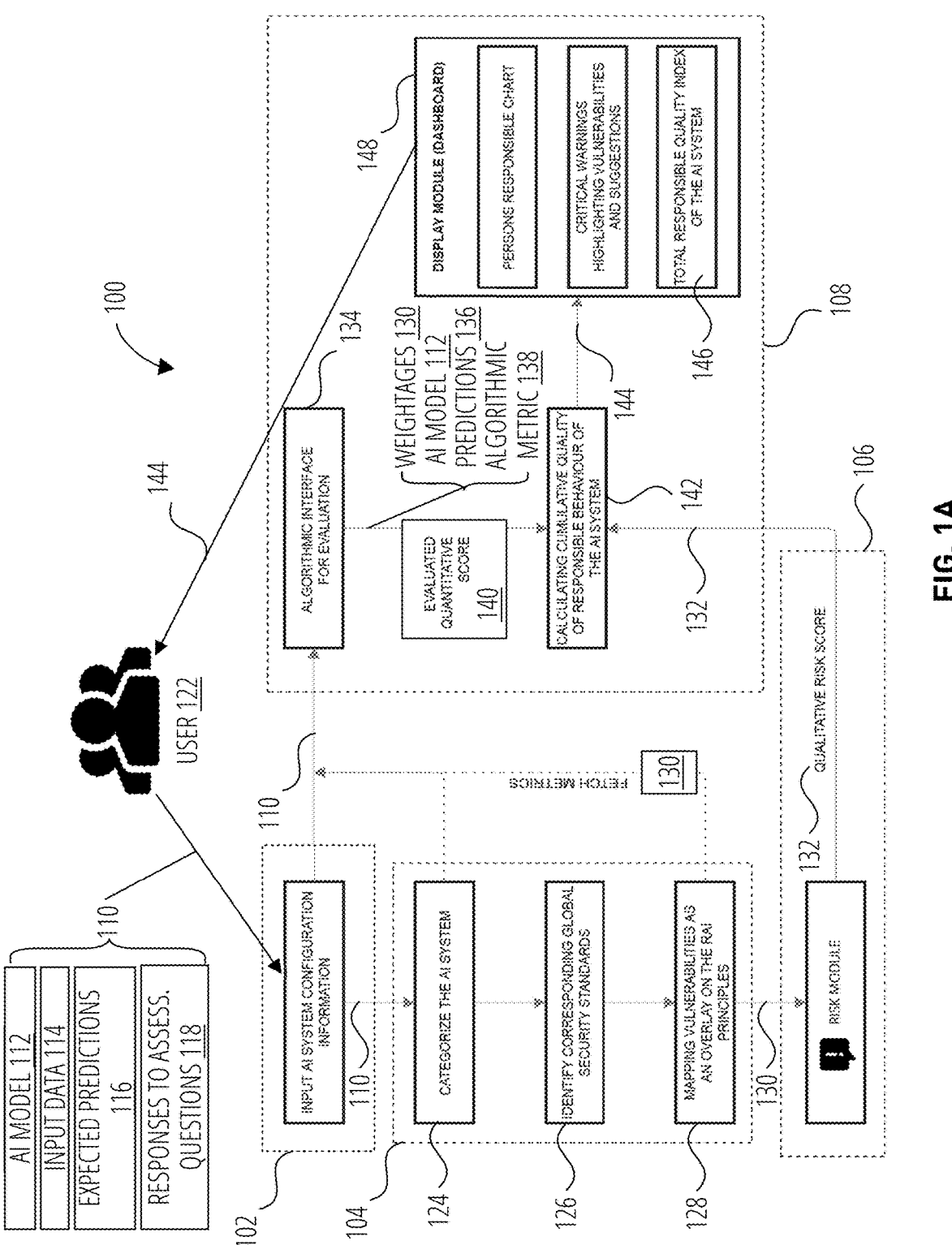
FIG. 1A illustrates a block diagram of a system for characterizing an AI model, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure. Furthermore, like reference numbers refer to similar or the same components within the figures.

DETAILED DESCRIPTION

Conventional artificial intelligence (AI) systems rely heavily on manual user intervention when determining whether the AI system output is safe, trustworthy, and truthful. For example, there has been a lack of consensus and standardization for AI software developers regarding determining best practices for responsible AI ethical standards. Furthermore, existing methods, which can be manual and require human intervention, may not comprehensively cover the AI system's Software Development Life Cycle (SDLC) phases. There is also a shortage in validation techniques and tools users can use to evaluate AI systems. Previous methods have also not been able to account for foundation models like GPT-4, which can provide hallucinatory responses. Previous methods, though restricted to predictive model governance, may not cover the European (EU) AI Act or the NIST AI risk management frameworks. Therefore previous methods may not completely define whether current AI systems are safe, trustworthy, and truthful.

Previous systems and methods are not configured to classify AI systems into risk levels (unacceptable, high, limited, minimal), which is relevant to the EU AI Act's framework. Previous systems and methods are not configured to explicitly determine any human oversight mechanisms to be used with high-risk AI systems. Previous systems and methods lack transparency requirements for AI systems, especially regarding user interactions with high-risk or limited-risk AI systems like chatbots. Previous systems and methods do not explicitly determine prohibitions of certain high-risk AI practices, such as subliminal manipulation or exploiting vulnerable groups. Previous systems and methods do not account for the most recent advancements in generative AI standards, e.g., previous systems and methods can fall short of comprehensively addressing global responsible AI and safety demands. Most of the responsible AI frameworks for enterprise AI applications can be theoretical in nature, e.g., the systems and methods do not provide actionable methodology.

Systems and methods for automatically evaluating AI models are presented below, to address the shortcomings of the described conventional AI systems described above.

OVERVIEW OF SYSTEMS AND METHODS FOR AI MODEL EVALUATION

In some embodiments, the systems and methods presented herein can be used to evaluate or characterize the behavior of an AI model. In some examples, the systems and methods can evaluate or characterize the behavior of the AI model based on an analysis of information about the AI model and algorithmic metrics. The information about the AI model can include assessment questions about the AI model. The algorithmic metrics can include an automated determination whether the AI model's predictions deviate from expected results for that model. In an ideal state, the behavior of the AI model should be to provide predictions that are the same, or substantially close to, the expected predictions. In reality, it is more likely that the AI model will provide predictions which deviate from the expected results.

In some embodiments, the systems and methods presented herein can be used to automatically analyze responses to the assessment questions and output of the AI model to determine whether the AI model falls within an acceptable responsible AI model metrics threshold. If the output is within the provided threshold, the AI model can be characterized as a responsible AI (RAI) model. Furthermore, the systems and methods presented herein can be agnostic to the type of AI model, e.g., predictive AI models, generative AI models, among other AI models. The systems and methods can be used to check and accommodate for human and/or machine oversight to ensure comprehensive risk evaluations and mitigate blind spots. The systems and methods can be used to accommodate AI industry standards and regulatory requirements.

SYSTEM FOR AI MODEL EVALUATION

Referring to FIG. 1A, a block diagram of a system 100 for automatically evaluating an AI model is presented. In some embodiments, the system 100 can include an information collection module 102, an orchestration module 104, a performance assessment module 106, and an AI diagnostics platform 108. The system 100 of FIG. 1A can be implemented by the hardware and software of FIG. 8, FIG. 9, and FIG. 10.

In some embodiments, the information collection module 102 can be used to receive AI model information 110 from users 122. The AI model information 110 can include an input AI model 112, input data 114, expected predictions 116, and responses 118 to assessment questions 120. The AI model 112 can include a predictive AI model or a generative AI model, among other AI models. For example, in the case that the AI model 112 is a generative AI model, the AI model information 110 received by the information collection module 102 can include the generative AI model, the processed input data 114, the expected predictions 116 and a golden truth table that corresponds to the AI model 112, among other information. The input AI model 112 received at the information collection module 102 can be a link or reference to an AI model or a copy of the model itself. The input AI model 112 can be stored locally or remotely. The input AI model 112 can be a pretrained AI model. If the input AI model 112 is a link or reference to an AI model, the information collection module 102 can retrieve a copy of the AI model from the linked or referenced source. In other embodiments, input AI model 112 is a link or reference to a remotely stored AI model, and the system 100 is configured to provide input to and receive output from the remotely stored AI model. The input data 114 can include training data for training the AI model 112. The expected predictions 116 can include results that the AI model 112 is expected to generate based on the provided input data 114.

In some embodiments, the information collection module 102 can include a user interface (UI) that allows the users 122 to input the AI model information 110. In some examples, the users 122 can provide responses 118 to assessment questions 120 about the AI model 112 via the UI. The UI can include a graphical user interface (GUI), e.g., a GUI on an internet web browser. The UI can allow the users 122 to upload the AI model information 110 to the information collection module 102. In some examples, the users 122 can provide responses 118 to a questionnaire presented by the information collection module 102. The responses 118 can include answers to curated assessment questions 120 that help identify the performance of the AI model 112. The users 122 can include subject matter experts (SMEs)

with respect to the AI model 112 being characterized. Upon collecting the AI model information 110 from the users 122, the information collection module 102 can provide the received AI model information 110 to the orchestration module 104.

The orchestration module 104 can categorize, identify and map 128 the AI model 112 based on the received AI model information 110. In some embodiments, the orchestration module 104 can categorize 124 the AI model 112 into one or more use cases: unacceptable, high risk, limited, and minimal. The AI model 112 can be categorized 124 based on one or more responsible AI (RAI) pillars, e.g., shown in FIG. 3. The orchestration module 104 can categorize, identify, and map the AI model 112 automatically, or with the assistance of the users 122. In some examples, the users 122 can assist in categorizing, identifying, and mapping the AI model 112 using the GUI of the information collection module 102. The orchestration module 104 can identify 126 corresponding global AI security standards that apply to the AI model 112 based on the categorization 124. Subsequent to the categorization 124 and the identification 126 steps, the orchestration module 104 can map 128 the AI model 112 to particular responsible AI principles. The RAI principles can include the RAI principles described in FIG. 3 below. In some examples, the mapping 128 can include mapping vulnerabilities of the AI model 112 as an overlay over the RAI principles of FIG. 3.

In some embodiments, the orchestration module 104 can determine weightages 130 {Wc} that correspond to the one or more selected use cases (e.g., unacceptable, high risk, limited, and minimal). The weightages 130 can be determined with the help of the users 122, or can be determined automatically by the orchestration module 104. Once the weightages 130 are determined, the orchestration module 104 can provide the weightages 130 {Wc} to the performance assessment module 106. The performance assessment module 106 can use the weightages 130 for calculating a safety fraction 132. The safety fraction 132 can be calculated using the equation shown at FIG. 1B.

In some embodiments, the AI diagnostics platform 108 can receive the AI model information 110 from the information collection module 102. The AI diagnostics platform 108 can receive weightages 130 from the orchestration module 104. The AI diagnostics platform 108 can receive the safety fraction 132 from the performance assessment module 106. The AI model 112 can be used to generate predictions 136 based on the input data 114. In some examples, the predictions 136 can be generated by the user 122 and provided as part of the AI model information 110. In some examples, the AI diagnostics platform 108 can run the AI model 112 to generate the predictions 136. The AI diagnostics platform 108 can automatically compare the predictions 136 with the expected predictions 116 to calculate algorithmic metrics 138. The algorithmic metrics 138 can be used by the AI diagnostics platform 108 to determine whether predictions output by the AI model 112 deviate substantially from expected predictions 116.

In some embodiments, the AI diagnostics platform 108 can calculate 142 a RAI score 140 based on the algorithmic metrics 138 and the weightages 130. In one example, the RAI score 140 can be calculated using the equation 440 shown in FIG. 4B. The RAI score 140 can be determined based on on algorithmic metrics 138. The algorithmic metrics 138 can be used to automatically compare the predictions 136 of the AI model 112 with the expected predictions 116 to calculate the algorithmic metrics 138. The algorithmic metrics 138 can be used to calculate the RAI health score 144. In some examples, the RAI score 140 can be determined from multiple algorithmic metrics 138. Each of the RAI scores 140 can correspond to certain defined principles for a responsible AI model. The RAI score 140 can represent a percentage reflecting an overall responsibility of the AI model 112. In some examples, the system 100 can be dynamically updated based on ongoing evaluations and feedback loops. The dynamic nature can be captured by introducing a penalty factor into the system. The system 100 can use the RAI score 140 to calculate a RAI health score 144.

In some embodiments, the AI diagnostics platform 108 can calculate a RAI health score 144 based on the RAI score 140 and the safety fraction 132. The RAI health score 144 can be used to characterize the AI model based on RAI health metrics 146. The RAI health metrics 146 can vary depending on how the predictions 136 compare to the expected predictions 116 for AI model 112. The RAI health metrics 146 can be used to determine and mitigate the likelihood of missing irresponsible behavior by the AI model 112 based on the resulting RAI health score 144. In some examples, the irresponsible behavior is representative of the AI model 112 providing predictions that extensively deviate from expected results. For example, the RAI health score 144 can be calculated using the RAI health score calculation 476 shown in FIG. 4B. The AI diagnostics platform 108 can compare the RAI health score 144 to a RAI health metric 146. The RAI health metric 146 can include, but is not limited to, the RAI health metric 600 of FIG. 6. The AI diagnostics platform 108 can include a dashboard 148. The AI diagnostics platform 108 can present the RAI health score 144 and the overall RAI health metric 146 via the dashboard 148 to the users 122.

Figure 1B:
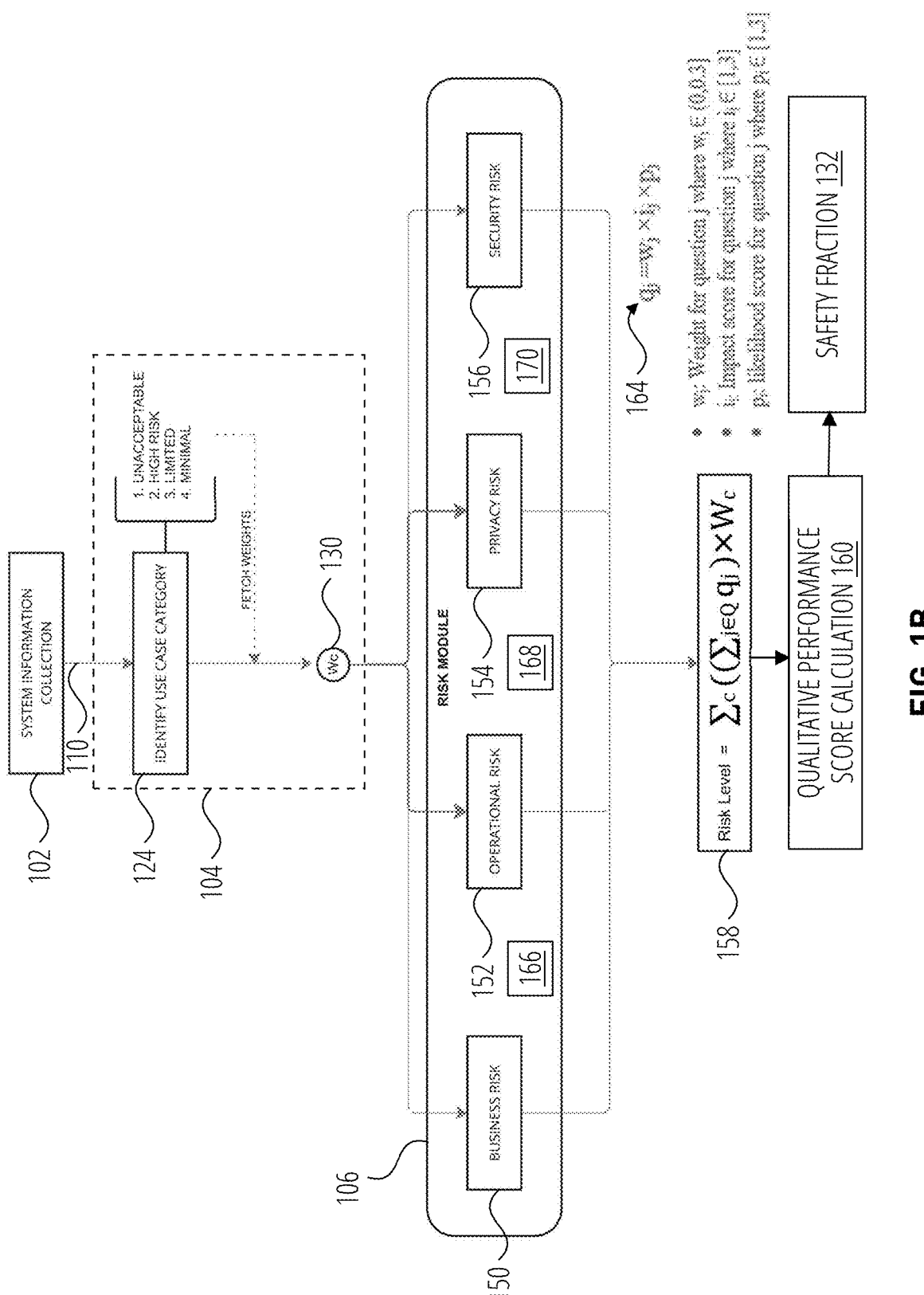
FIG. 1B illustrates a block diagram of the information collection module, orchestration module, and performance assessment module from FIG. 1A, according to some embodiments.

Referring to FIG. 1B, a block diagram for the information collection module 102, orchestration module 104, and performance assessment module 106 from FIG. 1A is shown, according to some embodiments. Based on the AI model information 110 received from the information collection module 102, the orchestration module 104 can categorize 124 the AI model 112 into one or more use cases: unacceptable, high risk, limited, and minimal. The orchestration module 104 can determine the weightages 130 {Wc} that correspond to the categorized assessment questions/submodules 150-156, and provide the weightages 130 to the performance assessment module 106.

Referring again to FIG. 1B, the performance assessment module 106 can include a collection of assessment question 120 categorized into sub-modules 150-156. In some examples, the sub-modules 150-156 can include assessment questions 120 curated by the SMEs to be aligned with the responsible AI pillars 300 of FIG. 3. The sub-modules, also referred to herein as categories, include business performance sub-module 150, operational performance sub-module 152, privacy sub-module 154, and security sub-module 156. The assessment questions 120 can be presented to the users 122 using the UI of information collection module 102. The users 122 can provide responses 118 to the assessment questions 120 using the UI. Exemplary assessment questions 220 from the table of assessment questions 200 are shown in FIG. 2.

Each of the sub-modules 150-156 can include their own associated assessment questions. Collectively, the assessment questions for each of the sub-modules 150-156 can be referred to as the assessment question 120. In some embodiments, the business performance sub-module 150 can include assessment questions used to evaluate the performance of the AI model 112 with respect to pre-defined business processes, financial outcomes, and strategic goals. The assessment questions from the business performance sub-module 150 can be used to analyze key metrics of the AI model 112. The assessment questions from the business performance sub-module 150 can be used to determine a probability of AI model 112 to fail, any misalignment of the AI model 112 with respect to business objectives, and any inefficiencies that AI model 112 could lead to socio-cultural-environmental harms or exposure to market volatility. The assessment questions from the operational performance sub-module 152 can be used to analyze the technical accuracy of the AI model 112. The assessment questions from the privacy sub-module 154 can be used to examine how the AI model 112 handles data. In some examples, the assessment questions from the privacy sub-module 154 can be used to evaluate the likelihood of any privacy violations performed by the AI model 112, primarily focusing on protocols enforced to safeguard personal and sensitive information from unauthorized access or exposure. The assessment questions from the privacy sub-module 154 can be used to analyze both inherent risks associated with the dataset used by the AI model 112, e.g., such as data sensitivity, data access limitations, anonymization techniques). In one example, the assessment questions from the privacy sub-module 154 can be used to analyze a potential propensity of the AI model 112 to produce privacy-infringing outcomes, such as via data leakage or re-identification of individuals. The assessment questions from the security sub-module 156 can be used to determine whether predictions by the AI model 112 are safe from unauthorized access and tampering, and can be used to check the data integrity of the AI model 112. For example, within each sub-module 150-156 there are critical and uncritical questions. Critical questions must be mandatorily responded to, and the uncritical, for example "which region are you targeting for deploying the AI system?" can be optional. To encourage the users 122 towards disclosure so as to get a more transparent and precise RAI score 140, each unanswered question adds a penalty affecting the overall RAI health score 144.

In some embodiments, the performance assessment module 106 can be used to calculate a risk level 158 of the AI model 112 based on the responses 118 to the assessment question 120 from the categories 150-156. In a first step, the performance assessment module 106 can automatically determine one or more category scores 164 ($q_j$) via the equation at 164. The category scores 164 are a representative score corresponding to each of the sub-modules/categories 150-156. Referring to the equation at 164, the ($q_j$) are calculated by multiplying a weightage ($w_j$), an impact score ($i_j$), and likelihood score ($p_j$) for each question from 150-156. In some examples, weightage ($w_j$) can have a range of approximately 0-0.3. The impact score ($i_j$) can have a range of approximately 1-3. The likelihood score ($p_j$) can have a range of approximately 1-3. the In a second step, a net total of all ($q_j$) are calculated within each of the categories 150-156, e.g., where j is the total number of questions. In a third step, the risk level 158 can be calculated by performing a summation of each of the category scores 164 and multiplied to respective weightages 130 ($W_c$), as shown at 158.

In some embodiments, the performance assessment module 106 can perform a calculation 162 to determine the safety fraction 132. The calculation for 162 is shown in FIG. 1C and described below.

Referring to FIG. 1C, equations used to calculate a safety fraction are shown, according to some embodiments. The equation 162 can be used to calculate the safety fraction 132 as shown. The equation 162 includes a penalty factor ($P_f$)

which is used to encourage users towards disclosing a more transparent and precise RAI score 140. The penalty factor ($P_f$) can be applied for unanswered or uncritical questions. The other variables for the equation at 162 include: $k_{fail}$=number of unanswered uncritical questions, $k_o$=total number of uncritical questions, and β=penalty coefficient that varies based on the number of unanswered questions from 150-156. In some examples, the safety fraction 132 can include a normalized score that indicates an overall performance of the AI model 112. As described herein, the safety fraction 132 can also be referred to as a safety fraction SL.

As described herein, FIG. 1A, FIG. 1B, and FIG. 1C can collectively be referred to herein as FIG. 1.

Table of Assessment Questions

Referring to FIG. 2, exemplary table of assessment questions 200 used to categorize an AI model are shown, according to some embodiments. The table of assessment questions 200 includes exemplary assessment questions 220, critical and/or uncritical, that can be used by the performance assessment module 106 of FIG. 1 to calculate the safety fraction 132. The table of assessment questions 200 also includes exemplary responses 218 to the assessment questions 220 shown. In some examples, the responses 218 to the assessment questions 220 can be pre-defined. In one example, each of the responses 218 can have a corresponding value: low impact: 1, medium impact: 2, and high impact: 3. The assessment questions 220 can include, but are not limited to, human-curated questions. The human-curated questions can be related to business, operational, security, and/or privacy aspects of an AI system where the AI model is used. In some examples, the assessment questions 220 can be divided into critical and/or uncritical aligning with global responsible AI and safety standards. In some examples, the uncritical questions may not necessarily mean the questions are less impactful than the critical questions. The uncritical questions can be used to provide flexibility to append business intelligence from subject matter experts, local safety standards, and/or global safety standards.

Responsible AI Pillars

Figure 3:
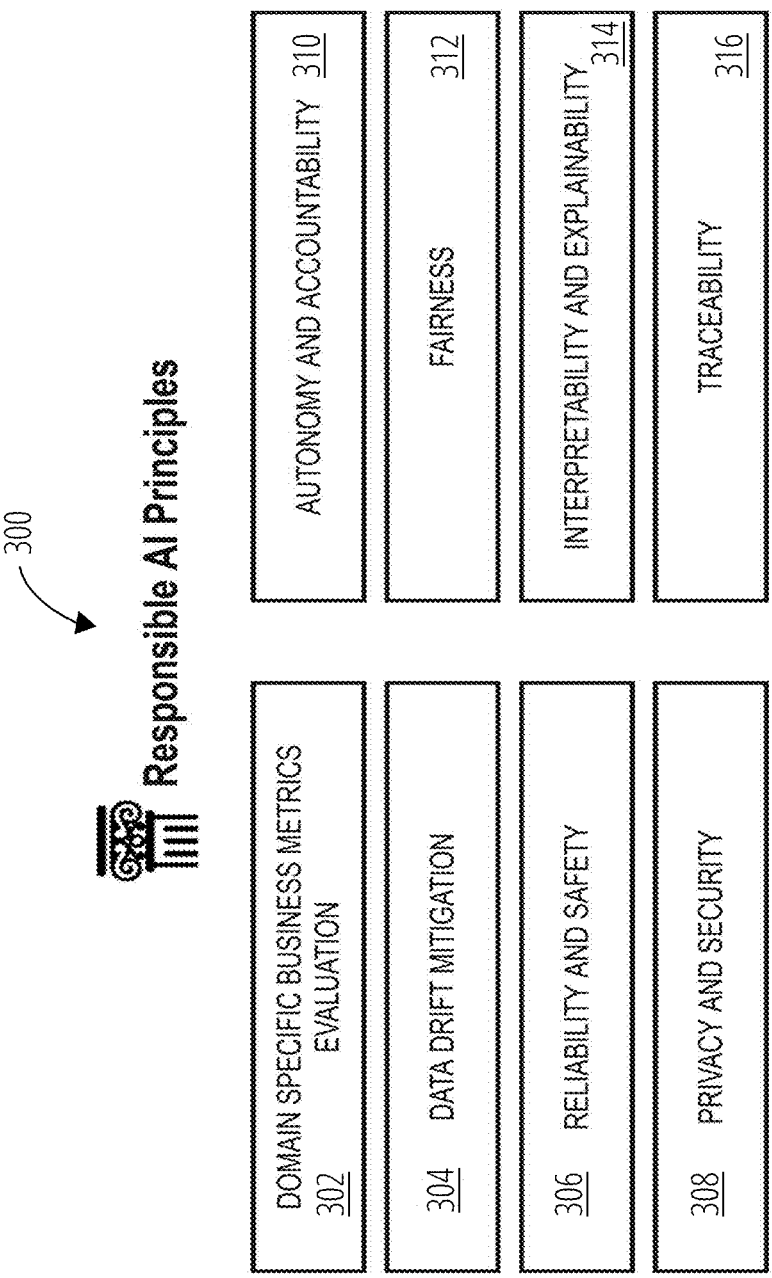
FIG. 3 illustrates responsible AI (RAI) assessment pillars, according to some embodiments.

Referring to FIG. 3, responsible AI (RAI) assessment pillars are shown, according to some embodiments. The responsible AI pillars 300 can include domain specific business metric 302, data drift mitigation 304, reliability and safety 306, privacy and security 308, autonomy and accountability 310, fairness 312, interpretability and explainability 314, and traceability 316. The pillars 302-316 can also be referred to as categories 302-316, among other terms. The orchestration module 104 from FIG. 1A and FIG. 1B uses each of the pillars 302-316 as a guideline for performing categorizing 124 the AI model 112. In some examples, the orchestration module 104 can include a corresponding module for each of the 302-316 which can be used in assisting the categorization 124 of the AI model 112. The modules for each of the 302-316 can include questionnaires or guide questions, similar to that of the assessment questions 220 of FIG. 2.

Responsible AI Diagnostic Platform

Figure 4A:
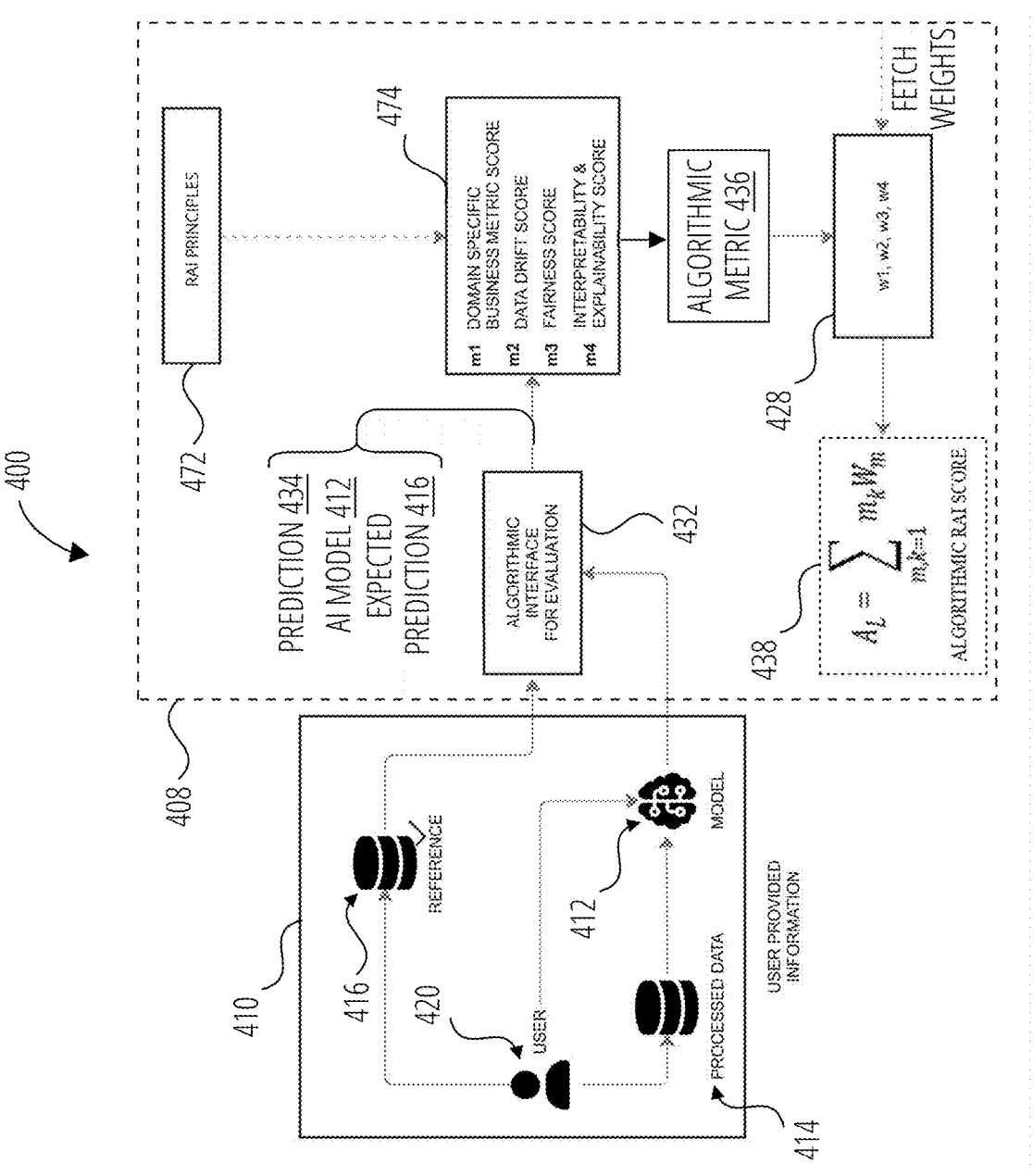
FIG. 4A illustrates a block diagram for a RAI diagnostics platform, according to some embodiments.

Referring to FIG. 4A, a block diagram for a RAI diagnostics platform 408 is shown, according to some embodiments. As described herein, the description for features using like reference numbers in FIG. 1, can be used to describe similar and/or the same features described in FIG. 4A, FIG. 4B, FIG. 4C and FIG. 4D, and vice versa. As described herein, FIG. 4A, FIG. 4B, FIG. 4C, and FIG. 4D, can collectively be referred to herein as FIG. 4.

Figure 4C:
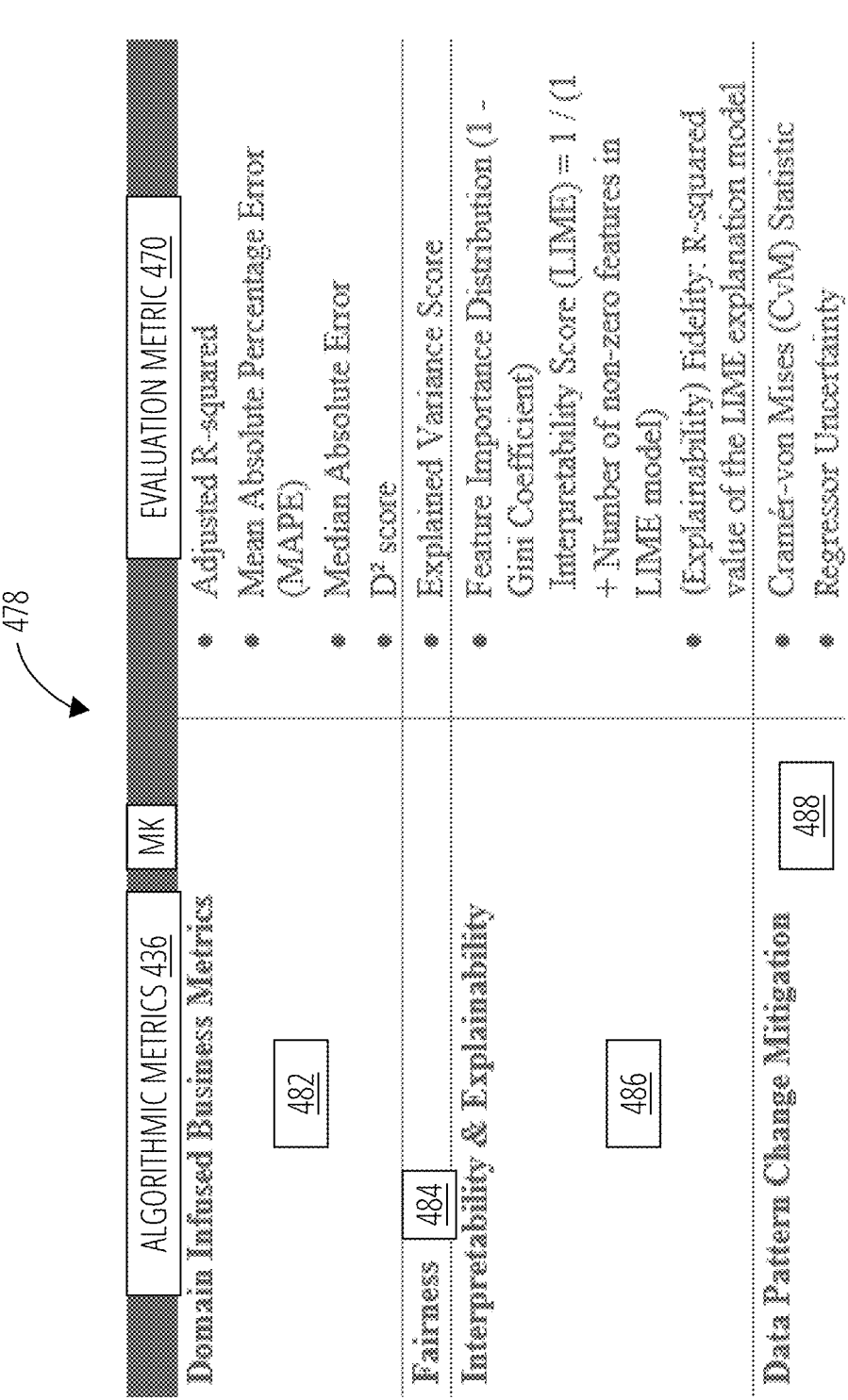
FIG. 4C illustrates an exemplary table of algorithmic metrics for AI models, according to some embodiments.

In some embodiments, the RAI diagnostics platform 408 can receive 432 AI model information 410 including the AI model 412, input data 414, and expected predictions 416. Similar to that described above, the AI model information 410 can be provided by a user 420, e.g., through the information collection module 102 of the system 100 as described above for FIG. 1A. The AI model information 410 can further include predictions 434 generated by the AI model 412, or the RAI diagnostics platform 408 can run the AI model 412 to generate the predictions 434. The RAI diagnostics platform 408 can automatically compare 474 the predictions 434 with the expected predictions 416 to calculate algorithmic metrics 436 ($m_k$), also referred to as $m_k$ values. Each of the RAI scores 438 are assigned to one of the 8 RAI pillars 300 from FIG. 3. In some examples, k can range between 1-8, e.g., one for each of the 8 pillars 300 shown in FIG. 3. The algorithmic metrics 436 ($m_k$) can also be referred to as a pillar metric score. The algorithmic metrics 436 can be made up of one or more evaluation metrics 470, e.g., one of the evaluation metrics listed under table 478 of FIG. 4C. The algorithmic metrics 436 ($m_k$) can be used by the RAI diagnostics platform 408 to determine whether predictions 434 output by the AI model 412 deviate substantially from expected prediction 416. A sample calculation of the algorithmic metrics 436 ($m_k$) is shown at FIG. 4C. The RAI diagnostics platform 408 can receive weightages 428 ($W_m$) from orchestration module, e.g., as described above for FIG. 1A. The weightages 428 can be represented by the variable ($W_m$). The weightages 428 ($W_m$) can vary for each algorithmic metric 436. In some examples, the weightages 428 ($W_m$) can be a predefined constant for each metric. The weightages 428 ($W_m$) can represent the weight or percent (%) contribution of that algorithmic metric. In some examples, the weightages 428 can be at 30% (0.3) for one algorithmic metric, and be at 20% (0.2) for another algorithmic metric 436. The RAI diagnostics platform 408 can calculate 440 a RAI score 438 based on the algorithmic metrics 436 ($m_k$) and the weightages 428 ($W_m$). The RAI score 438 can be calculated 440 using the equation shown in FIG. 1B.

Referring to FIG. 4B, equations used to calculate the RAI score and RAI health score are shown, according to some embodiments. The RAI score 438 ($A_L$) can be calculated using the equation 440 as shown. The RAI health score 442 can be calculated using the equation 478 as shown. The RAI health score 442 can be calculated by multiplying a performance constant 490 to a safety fraction 430 ($W_a$), multiplying an algorithmic constant 492 ($W_r$) to the RAI score 438, adding the results of each, and multiplying the summed result by 100 as shown at 476. In some examples, the performance constant 490 ($W_a$) can be approximately 40% (0.4), and the algorithmic constant 492 ($W_r$) can be approximately 70% (0.7). The performance constant 490 ($W_a$) and the algorithmic constant 492 ($W_r$) are examples only, and can be adjusted depending on the AI model to be characterized.

Referring to FIG. 4C, an exemplary table of algorithmic metrics for AI models 478 is shown, according to some embodiments. In some embodiments, the table of algorithmic metrics for AI models 478 represent metrics specific for a regression-based AI model. The algorithmic metrics for other AI models can be different and can vary. The tables at 478, 498 shown for FIG. 4C and FIG. 4D, respectively, are examples only, where other metrics on top of the metrics shown can be used. Therefore, the metrics used to characterize an AI model can be specifically selected, and/or adjusted to compute the RAI score for that AI model. In some embodiments, algorithmic metrics 436 can include domain infused business metric 482, fairness metric 484, interpretability and explainability 486, and data pattern change mitigation 488. The algorithmic metrics 436 ($m_k$) are determined based on one or more corresponding evaluation metrics 470. For a regression-based AI model, the evaluation metrics 470 can include an adjusted R-squared score, a mean absolute percentage error (MAPE), a median absolute error, a D-squared score, an explained variance score, a feature importance distribution, an interpretability score, a local interpretable model-agnostic explanations (LIME) score, a Cramér-von Mises (CvM) statistic, and/or a regressor uncertainty score. In some examples, the domain infused business metric 482 can have four corresponding evaluation metrics: including the adjusted R-squared, MAPE, MAE, and D-squared. The fairness metric 484 can have a single evaluation metric: explained variance score. The interpretability and explainability 486 can have three evaluation metrics: feature importance distribution, interpretability score (e.g., the interpretability score/Local interpretable model-agnostic explanations (LIME)=1/(1+Number of non-zero features in LIME model), and explainability/fidelity (e.g., R-squared value of the LIME explanation model). The data pattern change mitigation 488 can have two evaluation metrics: a Cramér-von Mises (CvM) statistic, and/or a regressor uncertainty score. Depending on the context, each of the evaluation metrics 470 can be applied differently, and thus the usage of each of the evaluation metrics 470 can be dynamically adjusted. In one example, some evaluation metrics 470 can be mathematically similar to each other, but their practical interpretation and application can vary substantially. For example for an evaluation metric 470 based on regression, the evaluation metric 470 may directly measure a magnitude of prediction errors and the AI model's explanatory power. In an example for an evaluation metric 470 using classification, the evaluation metric 470 can become less intuitive and may be replaced by a more appropriate evaluation metric 470. In some embodiments, the RAI diagnostics platform 408 can automatically identify whether one or more evaluation metrics 470 are appropriate for the corresponding algorithmic metric 436.

Referring to FIG. 4D, the table of algorithmic metrics from FIG. 4C including exemplary calculated metric scores is shown, according to some embodiments. For this example, the algorithmic metrics 436 can include domain infused business metric 482 ($m_1$), fairness metric 484 ($m_2$), interpretability and explainability 486 ($m_3$), and data pattern change mitigation 488 ($m_4$). The domain infused business metric 482 has four evaluation metrics 172 adjusted R-squared, MAPE, MAE, and D-squared. The four evaluation metrics 470 can be averaged to get a representative score for the domain infused business metric 482, here ($m_1$)=(0+1+1+1+2)/4=1.25. The fairness metric 484 has a single evaluation metric: explained variance score, thus ($m_2$)=2. The interpretability and explainability 486 has three evaluation metrics: feature importance distribution, interpretability score, and explainability/fidelity. The calculation for ($m_3$) results in ($m_3$)=(2+1+)/3=1.33. The data pattern change mitigation 488 has two evaluation metrics: a Cramér-von Mises (CvM) statistic, and/or a regressor uncertainty score. The data pattern change mitigation 488 ($m_4$) can be calculated as ($m_4$)=(2+2)/2=2. Therefore each of the calculated values for the algorithmic metrics 482, 484, 486, 488 respectively are ($m_1$)=1.25, ($m_2$)=2, ($m_3$)=1.33, and ($m_4$)=2. As described above, the algorithmic metrics 482, 484, 486, and 488 can be determined through an automatically by the RAI diagnostics platform 408, with no manual intervention.

EXAMPLE IMPLEMENTATIONS

Referring to FIG. 5A, an example first case 502 for characterizing an AI model is shown, according to some embodiments. The first case 502 includes an example where all assessment questions have been answered, and a total 40 assessment questions used. The first case 502 shows that a value of the penalty factor, here $\beta=0$, can imply changes to the AI model behavior.

Referring to FIG. 5B, an example second case 504 example for characterizing an AI model is shown, according to some embodiments. The second case 504 provides an example where some assessment questions are left unanswered, and a total 40 assessment questions used.

Figure 5C:
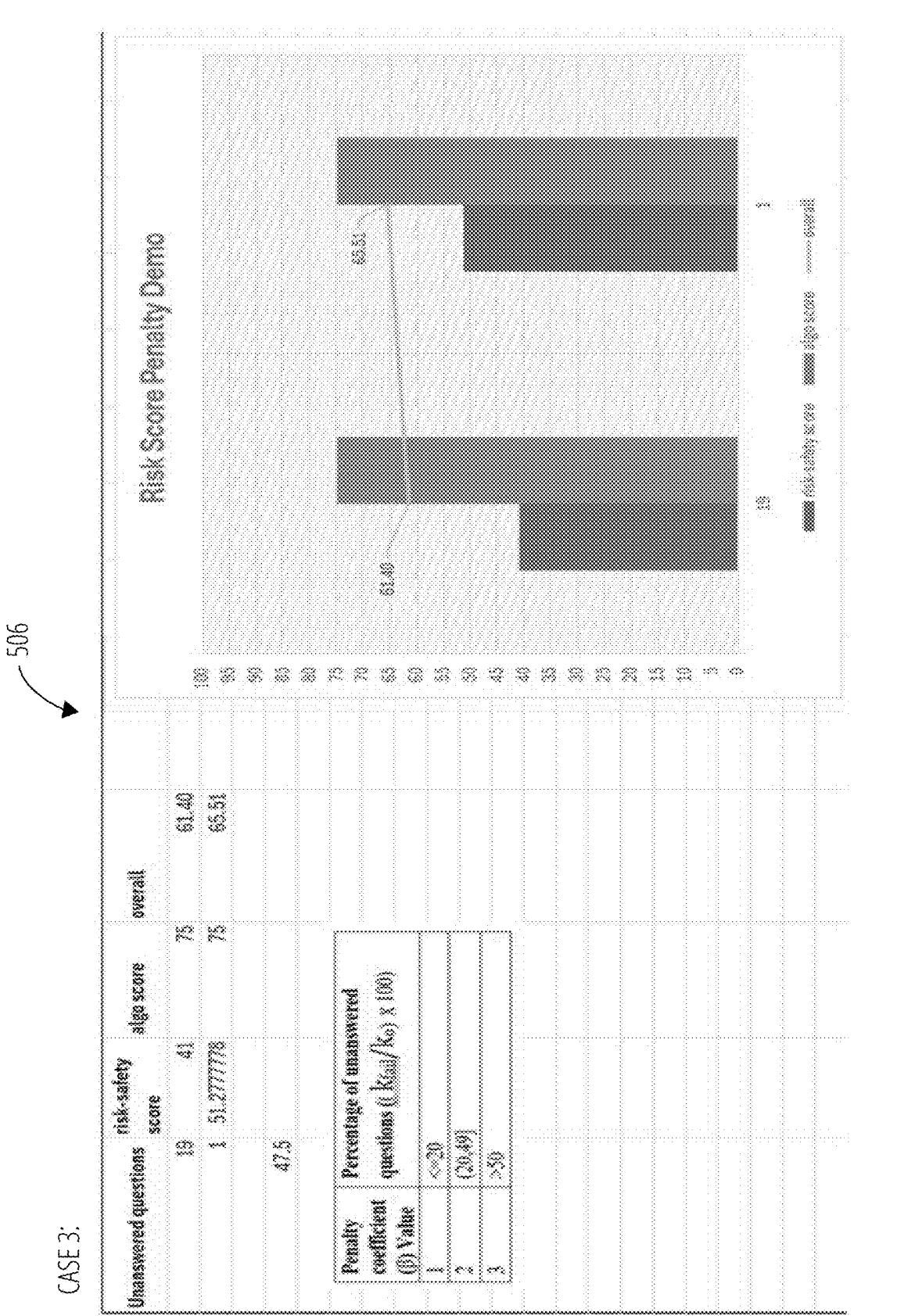
FIG. 5C illustrates an example third case for characterizing an AI model, according to some embodiments.

Referring to FIG. 5C, an example third case 506 for characterizing an AI model is shown, according to some embodiments. The third case 506 shows a graph comparing the calculated metric scores.

Figure 6:
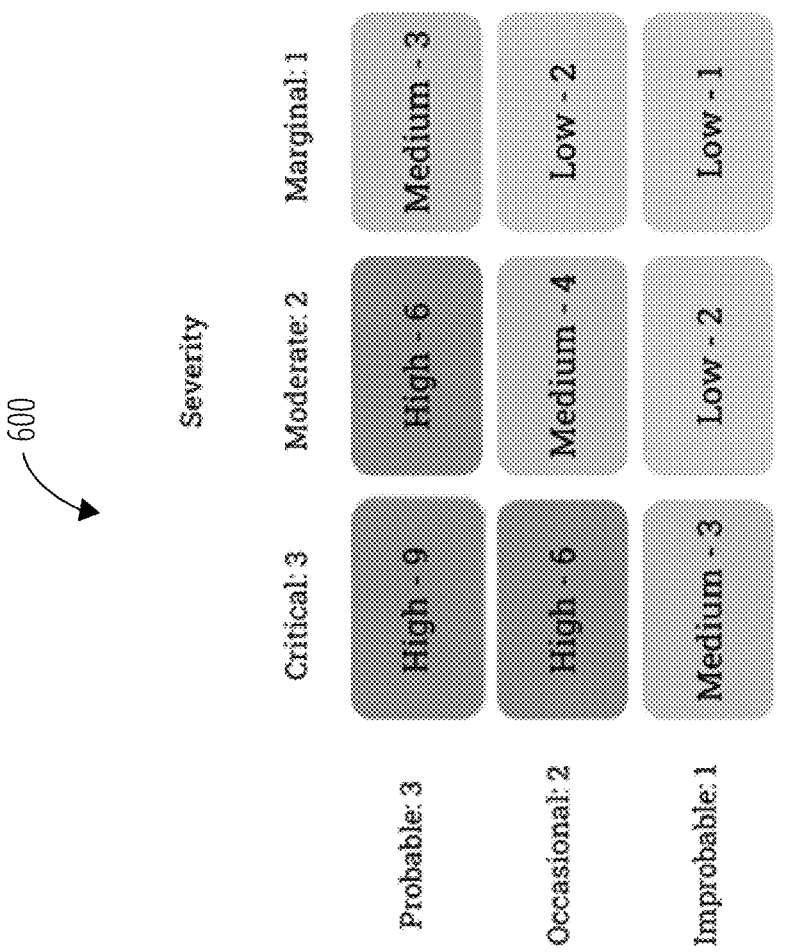
FIG. 6 illustrates a RAI health metric, according to some embodiments.

Referring to FIG. 6, a RAI health metric is shown, according to some embodiments. In some examples, the RAI health metrics 600 include a 3×3 metric having a maximum performance value at 9, and a minimum performance value at 1.

Method for Evaluating an AI Model

Referring to FIG. 7, a flowchart for a method for characterizing an AI model is shown, according to some embodiments. At a step 702, the method can include receiving, at a computer system comprising a processor and a memory storing instructions executable by the processor, a pretrained AI model, an input dataset, and an expected predictions dataset. The expected predictions dataset can include expected results of the pretrained AI model based on the input dataset. In some examples, receiving the pretrained AI model can include receiving a regression-based AI model. At a step 704, the method can include generating an actual predictions dataset using the pretrained AI model by providing, by the processor, the input dataset as input to the pretrained AI model and receiving, at the computer system, as output from the pretrained AI model a plurality of predictions based on the input dataset. At a step 706, the method can include calculating, by the processor, a plurality of algorithmic metrics based on the expected predictions dataset and the actual predictions dataset. At step 708, the method can include determining, by the processor, a responsible AI (RAI) score based on the plurality of algorithmic metrics. In some embodiments, provided a regression-based AI Model, the plurality of algorithmic metrics can include at least one of an adjusted R-squared score, a mean absolute percentage error (MAPE), a median absolute error (MAE), a D-squared score, an explained variance score, a feature importance distribution, an interpretability score, a local interpretable model-agnostic explanations (LIME) score, a Cramér-von Mises (CvM) statistic, or a Regressor Uncertainty score. At step 710, the method can include calculating, by the processor, a RAI health score based on the RAI score and a safety fraction. At a step 712, the method can comparing, by the processor, the RAI health score to a RAI health metric. In some examples, step 712 can include determining whether the RAI health score is approximately greater than, equal to, or less than, the RAI health metric. At a step 714, the method can include determining, by the processor, an overall RAI health of the pretrained AI model based on the comparison.

Improvements Over Existing AI Model Evaluation Techniques

Previous methods for evaluating AI models rely on manual analysis of an AI model's output to determine whether the AI model is safe, trustworthy, and truthful. Since the previous methods manually perform the analysis, the analysis may be subjective, and therefore may not consider any ethical standards that the AI model should adhere to. The previous methods can also take longer to perform, are fully dependent on the people performing the analysis, and therefore do not automatically evaluate the AI model based provided datasets. Also, the previous methods do not use flexible metrics in the analysis, e.g., metrics that can be adjusted depending on the type of input AI model provided. Furthermore, conventional applications for evaluating AI models fall short of providing partially automated and/or fully automated actions based on the results of the completed evaluation. The systems and methods address the challenges faced by previous methods, and provide an improvement to AI model evaluation technology, by: (i) automatically evaluating AI models without user intervention, (ii) performing evaluation that automatically considers ethical standards such as European (EU) AI Act or the NIST AI risk management frameworks, and (iii) using flexible metrics, such as the RAI health metrics, that can be adjusted depending on the input pretrained model (e.g., a predictive AI model, generative AI model, etc.).

Additional Applications

As described above, the present systems and methods provide numerous technological improvements. In addition, these techniques provide for applications in various technical fields, for example, the fields of enterprise network and data security, data integrity, and data analytics. In one embodiment, system 100 is in communication with one or more computers within an enterprise network that use AI models for development, accounting, or various other purposes and/or with a server that controls access to AI model within the network. Upon determining that the RAI health score or overall RAI health of a particular AI model, system 100 can communicate the RAI health score to network users of the enterprise network. In some examples upon receiving the RAI health score, the computers and/or server can present network users with a detailed report that explains why the AI model received the determined RAI health score, and how the score was calculated. Upon determining that the RAI health score or overall RAI health of a particular AI model does not meet a target threshold of RAI health metrics, system 100 can communicate this failure to the network users via the computers and/or server and, in some instances, based on the RAI health score the network users can submit a command through the computers and/or server that causes the AI model to be disabled. In some embodiments, system 100 can communicate the failure of the AI model to the computers and/or server and, in some instances, the computers and/or server can send a signal that causes the AI model to be disabled from further use. Similarly, a disabled AI model can be manually enabled by the network users or automatically enabled upon system 100 determining that the AI model meets the target threshold (e.g., after the AI model is updated to address certain risks). In a further embodiment, multiple target AI health thresholds are used in connection with an access control mechanism. In one example, there are two thresholds, A and B, with threshold B being higher than threshold A. If system 100 determines that the RAI health score or overall RAI health of a particular AI model falls below threshold A, the network users or system 100 can cause an access control list or similar mechanism to be updated so that access to the AI model is restricted to network users that are responsible for testing and evaluating AI models. If system 100 determines that the RAI health score or overall RAI health of the AI model is greater or equal to threshold A and less than threshold B, the network users or system 100 can cause the access control list or similar mechanism to be updated so that the aforementioned network users have access, as well as network users who would use the AI model for lower risk use cases (e.g., marketing content creators). If system 100 determines that the RAI health score or overall RAI health of the AI model is greater or equal to threshold B, the network users or system 100 can cause the access control list or similar mechanism to be updated so that all users network have access to the AI model. It is to be appreciated that there may be any number of thresholds, and access to AI models can be granted or restricted based on user role, user location, model use case, and other relevant factors. It is also to be appreciated that the network users can manually restrict access to the AI models based on the user role, user location, model use case, and other relevant factors.

In some embodiments, upon determining that the RAI health score or overall RAI health of a particular AI model does not meet a target threshold of RAI health metrics, the network users or system 100 can communicate this failure to the computers and/or server and, in some instances, send a command or signal that causes the computers and/or server to inform the users of the AI model of the evaluation results. In some examples, the network users, computers and/or server can send a signal that causes the computers and/or server to include a notification with the output of the AI model. The notification can include a disclaimer that the particular AI mode does not meet the target threshold of the RAI health metrics. Similarly, if the AI model meets the target threshold the notification can include a disclaimer that the particular AI mode meets the target threshold of the RAI health metrics.

In some embodiments, provided the AI model is being implemented in a development environment and upon determining that the RAI health score or overall RAI health of a particular AI model does not meet a target threshold of RAI health metrics, the network users or system 100 can communicate this failure to the computers and/or server hosting the AI model and, in some instances, the network users or system 100 can send a signal that causes the computers and/or server to automatically prevent deploying the AI model to a production environment. In some examples, the AI model can be prevented from being deployed into the production environment until the AI model meets the target threshold. In some examples, the network users or system 100 can send a signal that causes the computers and/or server to notify the users that the AI model does not meet the target threshold and thus is not yet ready for deployment into production. The notification can include a disclaimer that the particular AI mode does not meet the target threshold of the RAI health metrics and should not be deployed for general use. Similarly, if the AI model meets the target threshold the network users can manually deploy the AI model, or the system 100 can automatically deploy the AI model into the production environment. The network users or system 100 can send a notification to the users of the enterprise network that the AI model has been deployed.

In some embodiments, upon determining that the RAI health score or overall RAI health of a particular AI model meets a target threshold of RAI health metrics, the system 100 can communicate this result to the computers and/or server and, in some instances, the network users or the system 100 can send a signal that causes the computers and/or server to compare the RAI health metric results with respect to results for other AI models. In some examples, the network users can manually rank or the system 100 can automatically rank the AI model against other AI models based on the RAI health metric results. The ranking can be displayed to users of the enterprise network when choosing an AI model to implement. The ranking can be used by the network users or the system 100 to recommend an AI model for use by the users of the enterprise network.

Software Architecture

Figure 8:
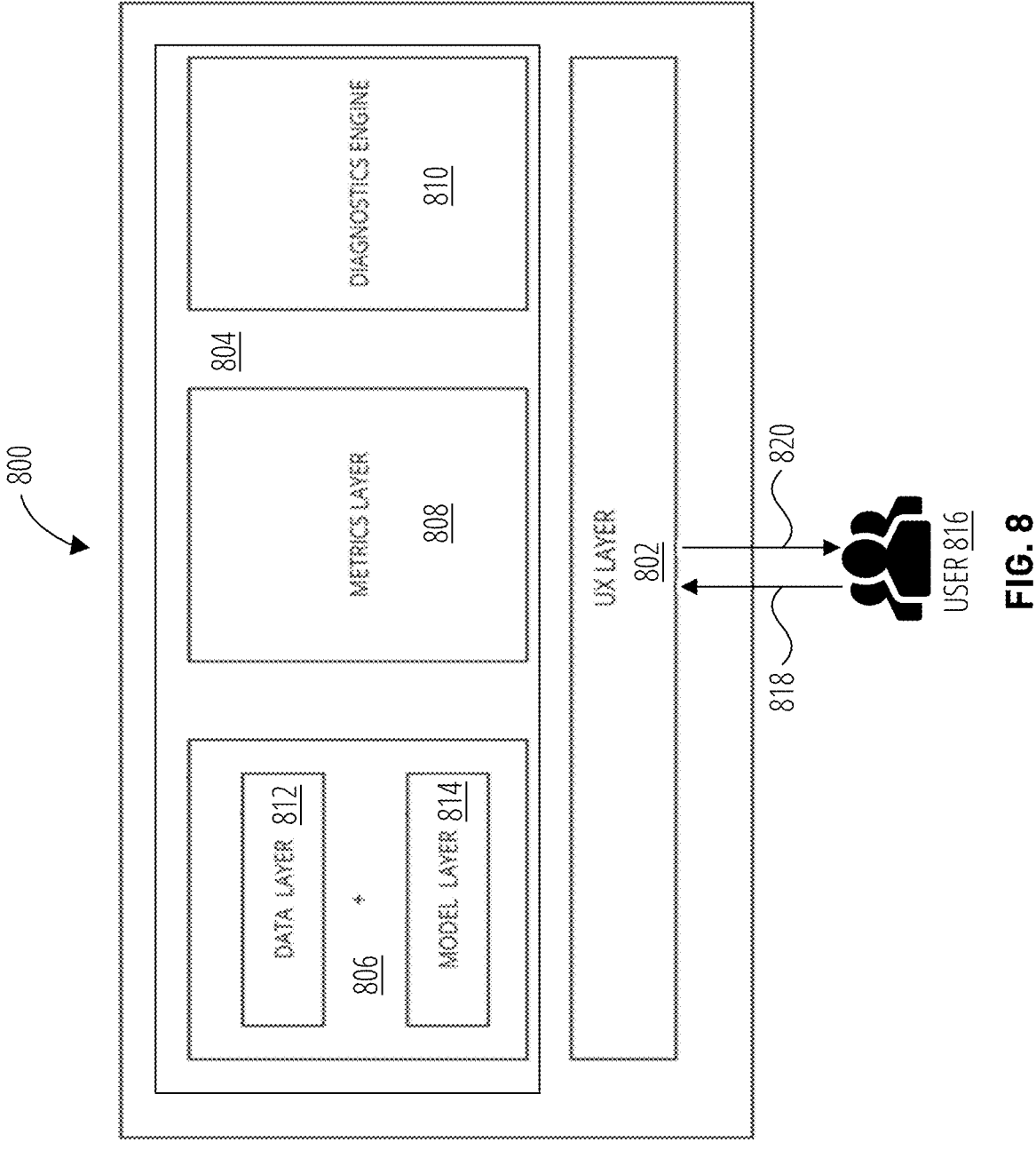
FIG. 8 illustrates a block diagram of a software architecture used in implementing the technology described herein, according to some embodiments.

Referring to FIG. 8, a block diagram of software architecture 800 used in implementing the technology described herein is shown, according to some embodiments. In some embodiments, the software architecture 800 includes a frontend layer 802 and backend layer 804.

In some embodiments, the frontend layer 802 can be used to receive input data 818 from the users 816. In some examples, the frontend layer 802 can also be referred to as user interface interface (UI) layer. The UI can be configured to present classification scores, assessment questions, and/or compliance indicators to facilitate decision-making by users of the software architecture 800.

In some embodiments, the frontend layer 802 can be configured to provide a user interface (UI) to the users 122. The frontend layer 802 can be used to submit and/or upload the input data 818 from users 122 via the UI. The input data 818 can include an AI model, AI model type, input data (e.g., training or test data), a compliance questionnaire, model card data, among other information. The users 816 can upload or submit a link to the AI model to be evaluated via the frontend layer 802. The users 122 can indicate an AI model type that corresponds to the AI model to be evaluated. In some examples, the model type can include a classification model, regression model, clustering model, retrieval-augmented generation (RAG) model, sentiment analysis model, among other AI models. The input data 818 can include test data, or training data. In some examples, the input data 114 can include datasets used during the training and testing. The compliance questionnaire can include a dynamic questionnaire filled out by one or more users to capture ethical considerations, legal adherence, and/or organizational policies that the AI model is expected to adhere to. The model card data can include a detailed model card documenting the AI model's purpose, intended use cases, known limitations, and/or including ethical guidelines that the AI model is expected to adhere to.

In some examples, the frontend layer 802 can include a category-based UI navigation that dynamically adapts the UI based on the AI model type. The frontend layer 802 can adjust the UI based on the provided AI model. In some examples, if the frontend layer 802 is provided with predictive AI models (e.g., classification, regression, clustering AI models), the frontend layer 802 can adjust the presented UI show to a category-specific analysis UI to the users 122. In another example, the frontend layer 802 can present a generative AI specific evaluation UI to the users 122 provided one or more generative AI models (e.g., RAG, sentiment analysis, among others) as input data 818. The frontend layer 802 can transmit the input data 818 received from the users 816 to the backend layer 804. The UI can allow the users 816 to modify, add, and/or remove metrics associated with an RAI pillar via the UI. The UI can include AI domain-specific customizations, and provide platform flexibility when using different AI models.

In some embodiments, the backend layer 804 can include an information layer 806, metrics layer 808, and diagnostics engine 810. In some examples, the information layer 806 can include a data layer 812 and model layer 814. In some examples, the backend layer 804 can receive the input data 818 from the frontend layer 802. The input data 818 can be stored on the data layer 812 and/or the model layer 814. Upon receiving the input data 818, the metrics layer 808 can automatically determine associated RAI scores 820 (RAI score 140, 438) based on the stored information at the data layer 812 and the model layer 814. The diagnostics engine 810 can be used to collate, prepare, and analyze curated assessment questions from the users 122 also received from the input data 818. The backend layer 804 can include a microservices architecture that can separate the operation of the metrics layer 808 and the diagnostics engine 810 from one another. The metrics layer 808 can perform metric validation, e.g., to determine one or more algorithmic metrics. The data layer 812 can be used to perform data validation on the input data 818. The diagnostics engine 810 can analyze and/or categorize assessment questions of the AI model. In some examples, metric computation, data validation, assessment question analysis, can all be performed independently from one another at the backend layer 804. The backend layer 804 can be used to determine a RAI health score 822 based on the RAI score 820 and assessment questions. The RAI health scores 822 can include a composite score summarizing the performance of the AI model across different pillars mentioned above. Once RAI health scores 822 are determined, the RAI health metrics 824 can be calculated for the AI model at the backend layer 804. The frontend layer 802 can present the RAI health metric 824 to the users 816. In some examples, the UI of the frontend layer 802 can prepare a detailed report summarizing the RAI health scores 822 and RAI health metrics 824. In one example, the UI can provide a downloadable PDF/HTML report that includes per-pillar scores, detailed explanation of metrics, model performance and compliance analysis, warnings and alerts as per the various scores, a summary RAI health score. The frontend layer 802 can include a summary dashboard. The summary dashboard. The summary dashboard can include a web-based dashboard allows the users 816 to explore individual metrics, pillar scores, and visualizations, such as Shapley Additive Explanations (SHAP) plots, and/or confusion matrices.

Network Architecture

Figure 9:
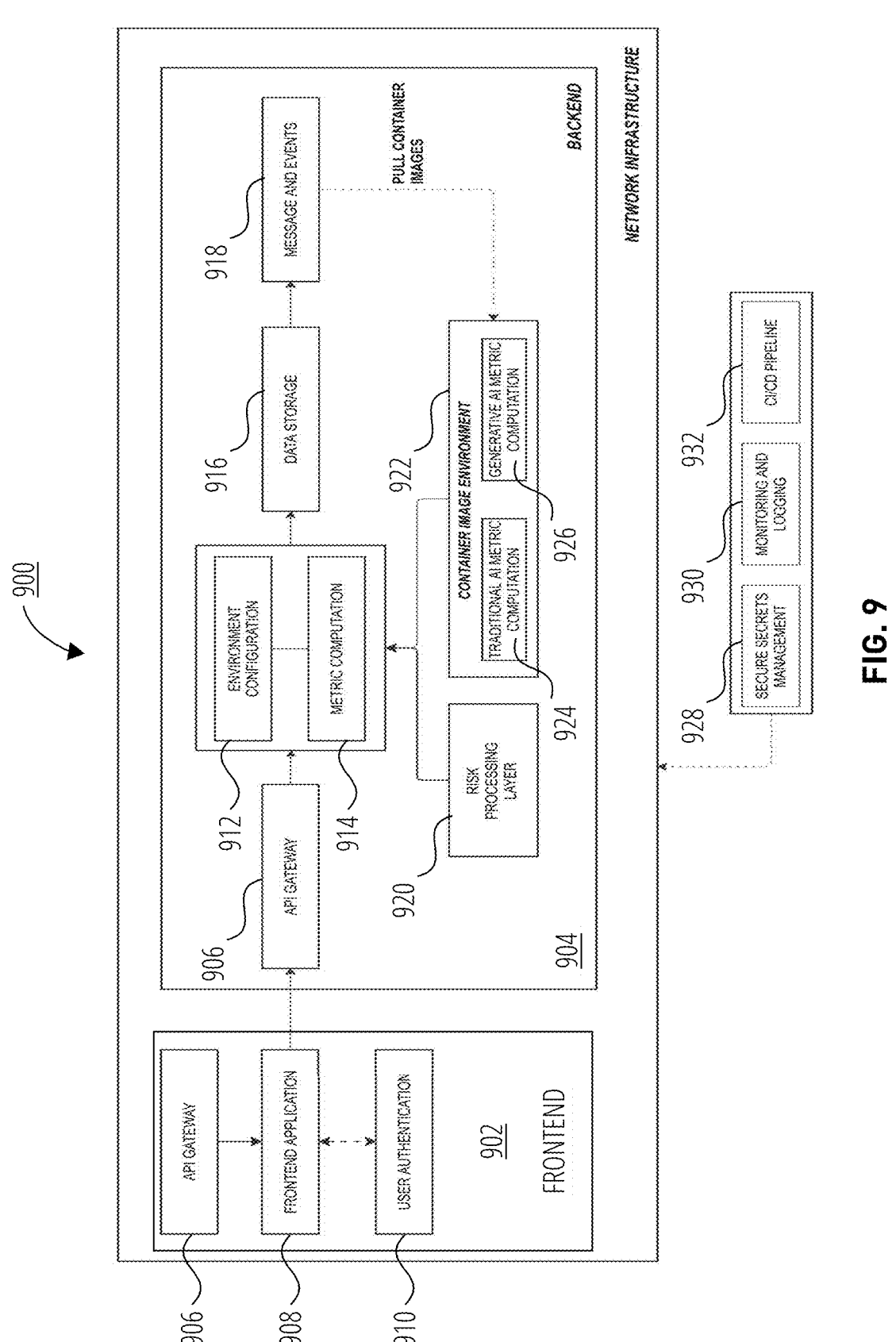
FIG. 9 illustrates an exemplary network infrastructure used in implementing the technology described herein, according to some embodiments.

Referring to FIG. 9, a network infrastructure 900 used in implementing the technology described herein is shown, according to some embodiments. In some examples, the network infrastructure 900 can include an API gateway 906, frontend application 908, user authentication 910, environment configuration 912, metric computation 914, data storage 916, message and events 918, performance processing layer 920, container image environment 922, traditional AI metric computation 924, generative AI metric computation 926, secure secrets management 928, monitoring and logging 930, and continuous integrations/continuous delivery (CI/CD) pipeline 932. In some examples, the network infrastructure 900 can be configured to support multi-cloud environments, allowing organizations to deploy the system across public and private cloud infrastructures. The performance processing layer 920 of the network infrastructure 900 can communicate with the backend layer 904 through the API gateway 906. In some examples, the network infrastructure 900 can include a feedback mechanism that allows users to report potential risks and incidents, which can be incorporated into the continuous improvement processes of the network infrastructure 900. The network infrastructure 900 can be configured to determine a RAI health score using the methods described herein. The network infrastructure 900 can use the determined RAI health score to provide quantitative insights into how well an AI model performs provided a given dataset. The network infrastructure 900 can present a comprehensive evaluation report to the users of the network infrastructure 900. The evaluation report can include a summary which describes the AI model's alignment with responsible AI principles and global responsible AI and safety standards. The network infrastructure 900 present proposals, steps, suggestions, and/or recommendations to the users to align the AI model to defined RAI principles. The evaluation report can includes overall performance metrics of the AI model, such as LIME and SHAP feature plots, to help users determine how likely the AI model may be prone to irresponsible behavior.

Hardware and Software Implementations

Figure 10:
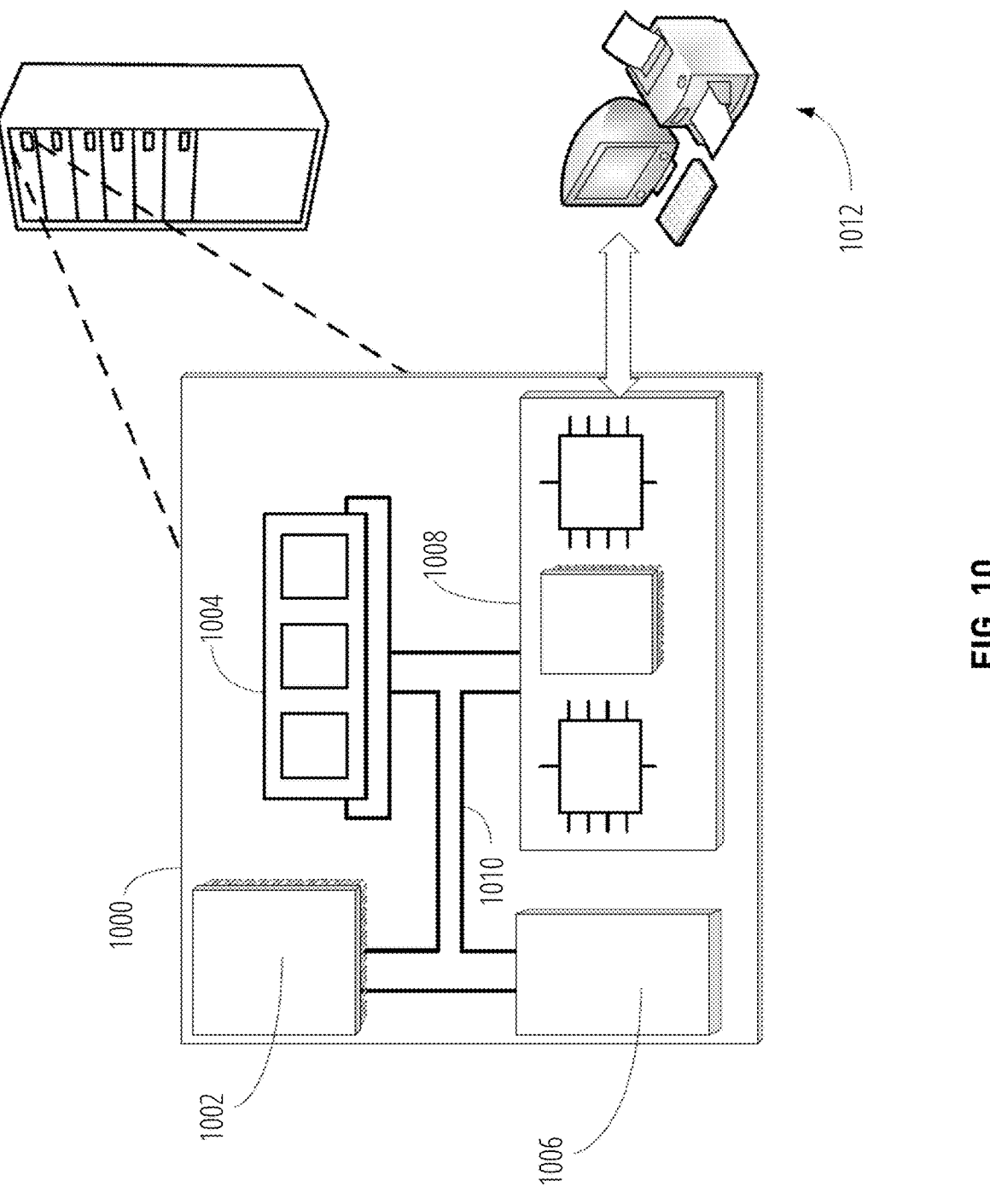
FIG. 10 illustrates a diagram of an exemplary hardware and software systems implementing the systems and methods described herein.

FIG. 10 is a block diagram of an example system 1000 that may be used in implementing the technology described in this document. As described herein, the system 1000 can also be referred to as a computer system 1000, among other terms. General-purpose computers, network appliances, mobile devices, or other electronic systems may also include at least portions of the system 1000. The system 1000 includes a processor 1002, a memory 1004, a storage device 1006, and an input/output device 1008. Each of the processor 1002, 1004, 1006, and 1008 may be interconnected, for example, using a system bus 1010. The processor 1002 is capable of processing instructions for execution within the system 1000. In some implementations, the processor 1002 is a single-threaded processor. In some implementations, the processor 1002 is a multi-threaded processor. The processor 1002 is capable of processing instructions stored in the memory 1004 or on the storage device 1006.

The memory 1004 stores information within the system 1000. In some implementations, the memory 1004 is a non-transitory computer-readable medium. In some implementations, the memory 1004 is a volatile memory unit. In some implementations, the memory 1004 is a non-volatile memory unit.

The storage device 1006 is capable of providing mass storage for the system 1000. In some implementations, the storage device 1006 is a non-transitory computer-readable medium. In various different implementations, the storage device 1006 may include, for example, a hard disk device, an optical disk device, a solid-date drive, a flash drive, or some other large capacity storage device. For example, the storage device may store long-term data (e.g., database data, file system data, etc.). The input/output device 1008 provides input/output operations for the system 1000. In some implementations, the input/output device 1008 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1012. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1006 may be implemented in a distributed way over a network, for example as a server farm or a set of widely distributed servers, or may be implemented in a single computing device.

Although an example processing system has been described in FIG. 10, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for automatic evaluation of an artificial intelligence (AI) model, the method comprising:

receiving, at a computer system comprising a processor and a memory storing instructions executable by the processor, a pretrained AI model, an input dataset, and an expected predictions dataset, wherein the expected predictions dataset comprises expected results of the pretrained AI model based on the input dataset;

generating an actual predictions dataset using the pretrained AI model by providing, by the processor, the input dataset as input to the pretrained AI model and receiving, at the computer system, as output from the pretrained AI model a plurality of predictions based on the input dataset;

calculating, by the processor, a plurality of algorithmic metrics based on the expected predictions dataset and the actual predictions dataset;

calculating, by the processor, a responsible AI (RAI) score based on;

calculating, by the processor, a safety fraction based on the equation:

$$\left[1-\left[\frac{\left(\sum_{c}\left(\sum_{i\in Q}q_{j}\right)\times W_{C}\right)+P_{f}}{\sum_{max}\left(\sum_{j\in Q}q_{j}\right)\times W_{C}}\right]\right]$$

wherein $q_j$ is a category score, $W_c$ is a weightage constant, and $P_f$ is a penalty factor;

calculating, by the processor, a RAI health score based on the RAI score and the safety fraction;

comparing, by the processor, the RAI health score to a RAI health metric;

determining, by the processor, an overall RAI health of the pretrained AI model based on the comparison; and based on the RAI health score, sending a signal to cause an enterprise network to prevent deploying or disable the pretrained AI model on the enterprise network.

2. The method of claim 1, wherein the pretrained AI model comprises at least one of predictive AI models or generative AI models.

3. The method of claim 1, wherein the input dataset comprises a training dataset.

4. The method of claim 1, wherein the expected predictions dataset comprises output data generated from a training AI model.

5. The method of claim 1, wherein receiving the pretrained AI model comprises receiving a regression-based AI model.

6. The method of claim 5, wherein the plurality of algorithmic metrics comprises at least one of an adjusted R-squared score, a mean absolute percentage error (MAPE), a median absolute error (MAE), a D-squared score, an explained variance score, a feature importance distribution, an interpretability score, a local interpretable model-agnostic explanations (LIME) score, a Cramér-von Mises (CvM) statistic, or a Regressor Uncertainty score.

7. The method of claim 1, wherein calculating the RAI health score comprises calculating the RAI health score based on the equation:

$$W_{r}[100\times S_{L}]+W_{a}\left(\sum(m_{k}\times W_{m})\times 100\right)$$

wherein $W_r$ is a performance constant, $W_a$ is an algorithmic constant, $m_k$ is an individual algorithmic metric of the plurality of algorithmic metrics, and $W_m$ is a weightage corresponding to the individual algorithmic metric, and $S_L$ is the safety fraction.

8. The method of claim 1, wherein calculating the plurality of algorithmic metrics comprises calculating at least one corresponding evaluation metric for each one of the plurality of algorithmic metrics.

9. The method of claim 1, wherein calculating the plurality of algorithmic metrics comprises calculating an average metric from the plurality of algorithmic metrics.

10. The method of claim 1, further comprising:

based on the RAI health score, sending a signal to cause an enterprise network to prevent deploying the pretrained AI model on the enterprise network.

11. The method of claim 1, further comprising based on the RAI health score, sending a signal to cause an enterprise network to disable the pretrained AI on the enterprise network.

12. The method of claim 1, wherein calculating the RAI score based on the plurality of algorithmic metrics comprises calculating the RAI score based on the equation:

$\sum_{m,k=1}m_{k}W_{m}$ wherein $m_k$ is an individual algorithmic metric of the plurality of algorithmic metrics, and $W_m$ is a weightage corresponding to the individual algorithmic metric.

13. A method for automatic evaluation of an artificial intelligence (AI) model, the method comprising:

receiving, at a computer system comprising a processor and a memory storing instructions executable by the processor, a pretrained AI model, an input dataset, and an expected predictions dataset, wherein the expected predictions dataset comprises expected results of the pretrained AI model based on the input dataset;

generating an actual predictions dataset using the pretrained AI model by providing, by the processor, the input dataset as input to the pretrained AI model and receiving, at the computer system, as output from the pretrained AI model a plurality of predictions based on the input dataset;

calculating, by the processor, a plurality of algorithmic metrics based on the expected predictions dataset and the actual predictions dataset;

calculating, by the processor, a responsible AI (RAI) score based on the plurality of algorithmic metrics;

calculating, by the processor, a safety fraction based on the equation:

$$\left[1-\left[\frac{\left(\sum_{c}\left(\sum_{i\in Q}q_{j}\right)\times W_{C}\right)+P_{f}}{\sum_{max}\left(\sum_{j\in Q}q_{j}\right)\times W_{C}}\right]\right]$$

wherein $q_j$ is a category score, $W_c$ is a weightage constant, and $P_f$ is a penalty factor;

calculating, by the processor, a RAI health score based on the RAI score and the safety fraction;

comparing, by the processor, the RAI health score to a RAI health metric; and based on the RAI health score, sending a signal to cause an enterprise network to prevent deploying or disable the pretrained AI model on the enterprise network.

14. The method of claim 13, further comprising determining, by the processor, an overall RAI health of the pretrained AI model based on the comparison.

15. The method of claim 13, wherein the pretrained AI model comprises at least one of predictive AI models or generative AI models.

16. The method of claim 13, wherein the input dataset comprises a training dataset.

17. The method of claim 13, wherein the expected predictions dataset comprises output data generated from a training AI model.

18. The method of claim 13, wherein receiving the pretrained AI model comprises receiving a regression-based AI model.

19. The method of claim 18, wherein the plurality of algorithmic metrics comprises at least one of an adjusted R-squared score, a mean absolute percentage error (MAPE), a median absolute error (MAE), a D-squared score, an explained variance score, a feature importance distribution, an interpretability score, a local interpretable model-agnostic explanations (LIME) score, a Cramér-von Mises (CvM) statistic, or a Regressor Uncertainty score.

20. The method of claim 13, wherein calculating the RAI health score comprises calculating the RAI health score based on the equation:

$$W_r[100 \times S_L] + W_a\left(\sum(m_k \times W_m) \times 100\right)$$

wherein $W_r$ is a performance constant, $W_a$ is an algorithmic constant, $m_k$ is an individual algorithmic metric of the plurality of algorithmic metrics, $W_m$ is a weightage corresponding to the individual algorithmic metric, and $S_L$ is the safety fraction.

21. The method of claim 13, wherein calculating the RAI score based on the plurality of algorithmic metrics comprises calculating the RAI score based on the equation: $\Sigma_{m,k=1} m_k W_m$ wherein $m_k$ is an individual algorithmic metric of the plurality of algorithmic metrics, and $W_m$ is a weightage corresponding to the individual algorithmic metric.

*   *   *   *   *